United States Patent
Raman et al.

(10) Patent No.: US 10,970,270 B2
(45) Date of Patent: Apr. 6, 2021

(54) UNIFIED DATA ORGANIZATION FOR MULTI-MODEL DISTRIBUTED DATABASES

(71) Applicant: Microsoft Technology Licensing, LLC, Redmond, WA (US)

(72) Inventors: Karthik Raman, Sammamish, WA (US); Momin Mahmoud Al-Ghosien, Sammamish, WA (US); Samer Boshra, Woodinville, WA (US); Brandon Chong, Kirkland, WA (US); Madhan Gajendran, Bengaluru (IN); Mikhail Mikhailovich Koltachev, Redmond, WA (US); Orestis Kostakis, Bellevue, WA (US); Aravind Ramachandran Krishna, Kirkland, WA (US); Liang Li, Sammamish, WA (US); Jayanta Mondal, Seattle, WA (US); Balachandar Perumalswamy, Kirkland, WA (US); Karan Vishwanath Popali, Bellevue, WA (US); Adrian Ilcu Predescu, Sammamish, WA (US); Vivek Ravindran, Redmond, WA (US); Ankur Savailal Shah, Redmond, WA (US); Pankaj Sharma, Kirkland, WA (US); Dharma Shukla, Bellevue, WA (US); Ashwini Singh, Bellevue, WA (US); Vinod Sridharan, Redmond, WA (US); Hari Sudan Sundar, Redmond, WA (US); Krishnan Sundaram, Bellevue, WA (US); Shireesh Kumar Thota, Redmond, WA (US); Oliver Drew Leonard Towers, Seattle, WA (US); Siddhesh Dilip Vethe, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 15/991,880

(22) Filed: May 29, 2018

(65) Prior Publication Data

US 2019/0340291 A1 Nov. 7, 2019

Related U.S. Application Data

(60) Provisional application No. 62/668,226, filed on May 7, 2018.

(51) Int. Cl.
*G06F 16/25* (2019.01)
*G06F 16/23* (2019.01)
(Continued)

(52) U.S. Cl.
CPC ........ *G06F 16/2365* (2019.01); *G06F 9/5077* (2013.01); *G06F 11/2007* (2013.01);
(Continued)

(58) Field of Classification Search
CPC .. G06F 16/2425; G06F 16/25; G06F 16/9025; G06F 16/2452; G06F 16/258
See application file for complete search history.

(56) References Cited

U.S. PATENT DOCUMENTS

| 5,446,880 A | 8/1995 | Balgeman et al. |
|---|---|---|
| 5,581,753 A | 12/1996 | Terry et al. |

(Continued)

FOREIGN PATENT DOCUMENTS

| CN | 102497410 A | 6/2012 |
|---|---|---|
| CN | 104935672 A | 9/2015 |

(Continued)

OTHER PUBLICATIONS

Chan et al., "Taming XPath Queries by Minimizing Wildcard Steps", 2004, Proceedings of the 30th VLDB Conference. (Year: 2004).*

(Continued)

US 10,970,270 B2

Page 2

*Primary Examiner* — Sheryl L Holland
(74) *Attorney, Agent, or Firm* — Alleman Hall Creasman & Tuttle LLP

(57) ABSTRACT

Databases are often provided according to various organizational models (e.g., document-oriented storage, key/value stores, and relational database), and are accessed through various access models (e.g., SQL, XPath, and schemaless queries). As data is shared across sources and applications, the dependency of a data service upon a particular organizational and/or access models may become confining. Instead, data services may store data in a base representation format, such as an atom-record-sequence model. New data received in a native item format may be converted into the base representation format for storage, and converted into a requested format to fulfill data requests. Queries may be translated from a native query format into a base query format that is applicable to the base representation format of the data set, e.g., via translation into an query intermediate language (such as JavaScript) and compilation into opcodes that are executed by a virtual machine within the database engine.

19 Claims, 10 Drawing Sheets

(51) Int. Cl.

| | |
|---|---|
| *G06F 16/27* | (2019.01) |
| *G06F 11/20* | (2006.01) |
| *G06F 16/22* | (2019.01) |
| *G06F 16/2452* | (2019.01) |
| *G06F 16/28* | (2019.01) |
| *G06F 16/21* | (2019.01) |
| *H04L 29/08* | (2006.01) |
| *G06F 9/50* | (2006.01) |
| *H04L 12/24* | (2006.01) |
| *H04L 12/911* | (2013.01) |
| *H04L 12/923* | (2013.01) |
| *G06F 16/182* | (2019.01) |
| *G06F 16/903* | (2019.01) |
| *H04L 29/06* | (2006.01) |

(52) U.S. Cl.
CPC ...... *G06F 11/2023* (2013.01); *G06F 11/2056* (2013.01); *G06F 16/184* (2019.01); *G06F 16/211* (2019.01); *G06F 16/219* (2019.01); *G06F 16/2246* (2019.01); *G06F 16/2255* (2019.01); *G06F 16/2272* (2019.01); *G06F 16/2315* (2019.01); *G06F 16/2322* (2019.01); *G06F 16/2329* (2019.01); *G06F 16/2336* (2019.01); *G06F 16/2452* (2019.01); *G06F 16/252* (2019.01); *G06F 16/258* (2019.01); *G06F 16/27* (2019.01); *G06F 16/28* (2019.01); *G06F 16/903* (2019.01); *H04L 41/0803* (2013.01); *H04L 41/0896* (2013.01); *H04L 41/5009* (2013.01); *H04L 41/5019* (2013.01); *H04L 41/5022* (2013.01); *H04L 41/5032* (2013.01); *H04L 47/72* (2013.01); *H04L 47/762* (2013.01); *H04L 67/1008* (2013.01); *H04L 67/1012* (2013.01); *H04L 67/1034* (2013.01); *H04L 69/24* (2013.01); *G06F 2201/80* (2013.01); *H04L 67/1029* (2013.01)

(56) References Cited

U.S. PATENT DOCUMENTS

| | | |
|---|---|---|
| 5,581,754 A | 12/1996 | Terry et al. |
| 5,787,262 A | 7/1998 | Shakib et al. |
| 5,923,850 A | 7/1999 | Barroux |
| 6,523,032 B1 | 2/2003 | Sunkara et al. |
| 6,535,874 B2 | 3/2003 | Purcell |
| 6,925,457 B2 | 8/2005 | Britton et al. |
| 7,117,221 B2 | 10/2006 | Hahn et al. |
| 7,269,648 B1 | 9/2007 | Krishnan et al. |
| 7,509,354 B2 | 3/2009 | McGarvey |
| 7,606,838 B2 | 10/2009 | Tobies |
| 7,689,599 B1 | 3/2010 | Shah et al. |
| 7,751,331 B1 | 7/2010 | Blair et al. |
| 7,774,473 B2 | 8/2010 | Elving et al. |
| 7,877,644 B2 | 1/2011 | Stenzel |
| 8,311,981 B2 | 11/2012 | Braginsky et al. |
| 8,326,807 B2 | 12/2012 | Aiyer et al. |
| 8,386,421 B2 | 2/2013 | Reid et al. |
| 8,392,482 B1 | 3/2013 | McAlister et al. |
| 8,572,022 B2 | 10/2013 | Hagan et al. |
| 8,595,267 B2 | 11/2013 | Sivasubramanian et al. |
| 8,694,639 B1 | 4/2014 | Vermeulen et al. |
| 8,719,313 B2 | 5/2014 | Swett et al. |
| 8,745,127 B2 | 6/2014 | Gopal et al. |
| 8,824,286 B2 | 9/2014 | Lee et al. |
| 8,862,588 B1 | 10/2014 | Gay et al. |
| 8,880,508 B2 | 11/2014 | Jeong et al. |
| 8,943,180 B1 | 1/2015 | Petit-Huguenin |
| 8,972,491 B2 | 3/2015 | Abu-Libdeh et al. |
| 9,026,493 B1 | 5/2015 | Weng |
| 9,195,725 B2 | 11/2015 | Brown et al. |
| 9,219,686 B2 | 12/2015 | Hilt et al. |
| 9,225,770 B2 | 12/2015 | Wang et al. |
| 9,230,040 B2 | 1/2016 | Shukla et al. |
| 9,244,926 B2 | 1/2016 | Kakivaya et al. |
| 9,292,566 B2 | 3/2016 | Golab et al. |
| 9,356,793 B1 | 5/2016 | Drobychev et al. |
| 9,405,474 B2 | 8/2016 | Shukla et al. |
| 9,411,873 B2 | 8/2016 | Rath et al. |
| 9,460,129 B2 | 10/2016 | Mann |
| 9,462,427 B2 | 10/2016 | Patel et al. |
| 9,471,711 B2 | 10/2016 | Abadi et al. |
| 9,569,513 B1 | 2/2017 | Vig et al. |
| 9,619,261 B2 | 4/2017 | Gaurav et al. |
| 9,632,828 B1 | 4/2017 | Mehta et al. |
| 9,645,835 B2 | 5/2017 | Phillips et al. |
| 9,781,124 B2 | 10/2017 | Goldberg et al. |
| 9,888,067 B1 | 2/2018 | Yemini et al. |
| 10,552,443 B1* | 2/2020 | Wu ............... G06F 16/2246 |
| 2002/0035642 A1 | 3/2002 | Clarke et al. |
| 2002/0161757 A1 | 10/2002 | Mock et al. |
| 2003/0037283 A1 | 2/2003 | Srinivasan et al. |
| 2003/0046396 A1 | 3/2003 | Richter et al. |
| 2003/0135643 A1 | 6/2003 | Chiu et al. |
| 2003/0220966 A1 | 11/2003 | Hepper et al. |
| 2004/0230571 A1 | 11/2004 | Robertson |
| 2004/0236801 A1 | 11/2004 | Borden et al. |
| 2005/0138170 A1 | 6/2005 | Cherkasova et al. |
| 2005/0160133 A1 | 7/2005 | Greenlee et al. |
| 2006/0106879 A1 | 5/2006 | Zondervan et al. |
| 2006/0155945 A1 | 7/2006 | Mcgarvey |
| 2006/0224773 A1 | 10/2006 | Degenaro et al. |
| 2006/0282836 A1 | 12/2006 | Barker |
| 2007/0073675 A1 | 3/2007 | Kaar et al. |
| 2008/0147627 A1* | 6/2008 | Natkovich ............ G06F 16/2454 |
| 2008/0301025 A1 | 12/2008 | Boss et al. |
| 2009/0248737 A1* | 10/2009 | Shukla ............ G06F 9/44 |
| 2010/0082630 A1 | 4/2010 | Zagelow et al. |
| 2010/0094838 A1 | 4/2010 | Kozak |
| 2011/0149743 A1 | 6/2011 | Agarwal et al. |
| 2011/0258483 A1 | 10/2011 | Elson et al. |
| 2012/0136839 A1 | 5/2012 | Eberlein et al. |
| 2012/0185444 A1 | 7/2012 | Sparkes et al. |
| 2013/0064110 A1 | 3/2013 | Polinati et al. |
| 2013/0159253 A1 | 6/2013 | Dewall et al. |
| 2013/0232153 A1 | 9/2013 | Dhuse et al. |

(56) References Cited

U.S. PATENT DOCUMENTS

| | | |
|---|---|---|
| 2013/0254164 A1 | 9/2013 | Tsofi et al. |
| 2014/0052761 A1 | 2/2014 | Teitelbaum |
| 2014/0101298 A1 | 4/2014 | Shukla et al. |
| 2014/0195514 A1 | 7/2014 | Stein |
| 2014/0279844 A1 | 9/2014 | Shukla et al. |
| 2014/0297776 A1 | 10/2014 | Volvovski et al. |
| 2014/0304371 A1 | 10/2014 | Mraz et al. |
| 2014/0359348 A1 | 12/2014 | Volvovski et al. |
| 2015/0026189 A1 | 1/2015 | Li et al. |
| 2015/0154074 A1 | 6/2015 | Resch et al. |
| 2015/0195162 A1 | 7/2015 | Gandham et al. |
| 2015/0269239 A1 | 9/2015 | Swift et al. |
| 2015/0304983 A1 | 10/2015 | Krening et al. |
| 2016/0034433 A1 | 2/2016 | Yamat et al. |
| 2016/0321588 A1 | 11/2016 | Das et al. |
| 2016/0342645 A1 | 11/2016 | Tempero et al. |
| 2017/0068713 A1 | 3/2017 | Joshi et al. |
| 2017/0123948 A1 | 5/2017 | Dhuse et al. |
| 2017/0199770 A1 | 7/2017 | Peteva et al. |
| 2017/0201597 A1 | 7/2017 | Narasimhan et al. |
| 2017/0220651 A1 | 8/2017 | Mathew et al. |
| 2017/0286180 A1 | 10/2017 | He et al. |
| 2017/0293540 A1 | 10/2017 | Mehta et al. |
| 2017/0308562 A1 | 10/2017 | Sreekantaiah et al. |
| 2017/0308601 A1 | 10/2017 | Massarenti et al. |
| 2017/0318085 A1 | 11/2017 | Shukla et al. |
| 2017/0364345 A1 | 12/2017 | Fontoura et al. |
| 2018/0150331 A1 | 5/2018 | Chen et al. |
| 2018/0316752 A1 | 11/2018 | Hodges et al. |
| 2019/0163391 A1 | 5/2019 | Annamalai et al. |
| 2019/0166019 A1 | 5/2019 | Jagadeesh |
| 2019/0171737 A1 | 6/2019 | Duan et al. |
| 2019/0196878 A1 | 6/2019 | Li |
| 2019/0340166 A1 | 11/2019 | Raman et al. |
| 2019/0340167 A1 | 11/2019 | Raman et al. |
| 2019/0340168 A1 | 11/2019 | Raman et al. |
| 2019/0340265 A1 | 11/2019 | Raman et al. |
| 2019/0340273 A1 | 11/2019 | Raman et al. |
| 2019/0342188 A1 | 11/2019 | Raman et al. |
| 2019/0342379 A1 | 11/2019 | Shukla et al. |
| 2019/0342380 A1 | 11/2019 | Thota et al. |

FOREIGN PATENT DOCUMENTS

| | | |
|---|---|---|
| WO | 9735270 A1 | 9/1997 |
| WO | 2008100795 A1 | 8/2008 |
| WO | 2010048595 A2 | 4/2010 |

OTHER PUBLICATIONS

He et al., "Query Lanaguage and Access Methods for Graph Databases", 2010, "Managing and Mining Graph Data", Springer, pp. 125-160. (Year: 2010).*

C. Buckler, "How to Convert XML to a JSON-Like JavaScript Object", 2011, www.sitepoint.com/how-to-convert-xml-to-a-javascript-object. Downloaded May 28, 2020. (Year: 2011).*

"International Search Report and Written Opinion Issued in PCT Application No. PCT/US2019/031207", dated Jul. 19, 2019, 13 Pages.

"International Search Report and Written Opinion Issued in PCT Application No. PCT/US2019/031204", dated Jul. 19, 2019, 14 Pages.

"International Search Report and Written Opinion Issued in PCT Application No. PCT/US2019/031208", dated Jul. 24, 2019, 15 Pages.

"Non Final Office Action Issued in U.S. Appl. No. 15/991,953", dated Aug. 22, 2019, 21 Pages.

"Non Final Office Action Issued in U.S. Appl. No. 15/991,632", dated Jan. 24, 2020, 23 Pages.

"Final Office Action Issued in U.S. Appl. No. 15/991,953", dated Feb. 14, 2020, 24 Pages.

Likness, Jeremy, "Getting Behind the 9-Ball: Cosmos DB Consistency Levels Explained", Retrieved From: https://blog.jeremylikness.com/blog/2018-03-23_getting-behind-the-9ball-cosmosdb-consistency-levels/, Mar. 23, 2018, 8 Pages.

Montazerolghaem, et al., "Overload Control in SIP Networks: A Heuristic Approach based on Mathematical Optimization", In Proceedings of Global Communications Conference (GLOBECOM), Dec. 6, 2015, 6 Pages.

"Conflict Resolution", Retrieved from https://web.archive.org/web/20120402192233/https://docs.oracle.com/cd/E11882_01/server.112/e10706/repconflicts_htm, Apr. 2, 2012, 28 Pages.

"Conflict Resolution", Retrieved from https://docs.oracle.com/cd/F49540_01/DOC/server.815/a67791/ch6.htm, Retrieved Date: Aug. 31, 2018, 43 Pages.

"Conflict Resolution Concepts and Architecture", Retrieved from https://docs.oracle.com/cd/B10500_01/server.920/a96567/repconflicts.htm, Nov. 15, 2011, 35 Pages.

"Couchbase Server: Schemaless Data Modeling", Retrieved from https://developer.couchbase.com/documentation/server/3.x/developer/dev-guide-3.0/schemaless.html, Retrieved Date: Nov. 20, 2017, 5 Pages.

"Lotus Notes/Domino Replication Conflict Solver", Retrieved from https://web.archive.org/web/20100306134644/http://www.ytria.com/WebSite.nsf/WebPageRequest/Solutions_scanEZ_ConflictSolveren, Dec. 15, 2005, 2 Pages.

"Master Replication Concepts and Architecture", Retrieved from https://docs.oracle.com/cd/B10501_01/server.920/a96567/repmaster.htm, Feb. 17, 2012, 40 Pages.

"Master-master vs Master-slave Database Architecture?", Retrieved from https://stackoverflow.com/questions/3736969/master-master-vs-master-slave-database-architecture, Retrieved Date: Jul. 2, 2018, 8 Pages.

"Master-to-Slave Replication", Retrieved from https://www.ibm.com/support/knowledgecenter/en/POWER8/p8ha1/example2mastertoslavereplication.htm, Retrieved Date: Jul. 3, 2018, 4 Pages.

"Replica Set Elections", Retrieved from https://docs.mongodb.com/manual/core/replica-set-elections/, Retrieved Date: Jul. 2, 2018, 6 Pages .

Afriansyah, et al., "Model of Load Balancing Using Reliable Algorithm With Multi-Agent System", In Journal of IOP Conference Series: Materials Science and Engineering, vol. 190, Issue 1, Apr. 2017, 9 Pages.

Ardagna, et al., "SLA Based Resource Allocation Policies in Autonomic Environments", In Journal of Parallel and Distributed Computing, vol. 67, Issue 3, Mar. 1, 2007, pp. 259-270.

Fernandez, et al., "Autoscaling Web Applications in Heterogeneous Cloud Infrastructures", In Proceedings of IEEE International Conference on Cloud Engineering, Mar. 11, 2014, 11 Pages.

Gunda, et al., "Multi-master at global scale with Azure Cosmos DB", Retrieved from https://docs.microsoft.com/en-us/azure/cosmos-db/multi-region-writers, May 7, 2018, 9 Pages.

Liu, et al., "Consistency as a Service: Auditing Cloud Consistency", In Journal of IEEE Transactions on Network and Service Management, vol. 11, Issue 1, Mar. 2014, pp. 25-35.

Masha, et al., "Implement a Custom Conflict Resolver for a Merge Article", Retrieved from https://docs.microsoft.com/en-us/sql/relational-databases/replication/implement-a-custom-conflict-resolver-for-a-merge-article?view=sql-server-2017, Mar. 14, 2017, 6 Pages.

Patra, Chandan, "How to Use Consistency Models for Amazon Web Services", Retrieved from https://cloudacademy.com/blog/consistency-models-of-amazon-cloud-services/, Jun. 3, 2016, 9 Pages.

Shukla, et al., "Schema-Agnostic Indexing with Azure DocumentDB", In Proceedings of 41st International Conference on Very Large Data Bases, vol. 8, Issue 12, Aug. 1, 2015, pp. 1668-1679.

Singh, et al., "Server-Storage Virtualization: Integration and Load Balancing in Data Centers", In Proceedings of ACM/IEEE Conference on Supercomputing, Nov. 15, 2008, 12 Pages.

Thomsen, Jakob Holdgaard, "Uber Engineering: The Architecture of Schemaless, Uber Engineering's Trip Datastore Using MySQL", Retrieved from https://eng.ubercom/schemaless-part-two/, Jan. 15, 2016, 8 Pages.

(56) References Cited

OTHER PUBLICATIONS

"Non Final Office Action Issued in U.S. Appl. No. 15/991,953", dated Jul. 16, 2020, 24 Pages.
"Notice of Allowance Issued in U.S. Appl. No. 15/991,062", dated Mar. 18, 2020, 9 Pages.
"Non Final Office Action Issued in U.S. Appl. No. 15/991,223", dated Apr. 9, 2020, 15 Pages.
"Final Office Action Issued in U.S. Appl. No. 15/991,786", dated Oct. 23, 2020, 16 Pages.
Xue et al., "COMET: Client-Oriented Metadata Servcie for Highly Available Distributed File Systems", In Proceedings of 27th International Symposium on Computer Architecture and High Performance Computing (SBAC-PAD), Oct. 17, 2015, pp. 154-161.
"Non-Final Office Action Issued in U.S. Appl. No. 15/991,786", dated May 8, 2020, 36 Pages.
Moon, et al., "Introducing SSDs to the Hadoop MapReduce Framework", In Proceedings of 7th International conference on Cloud Computing, Jun. 27, 2014, pp. 272-279.
Lim, et al., "Automated Control for Elastic Storage", In Proceedings of the 7th International Conference on Autonomic computing, Jun. 7, 2010, pp. 1-10.
Kraska, et al., "Consistency Rationing in the Cloud: Pay only when it Matters", In Proceedings of the Very Large Data Bases Endowment, vol. 2, Issue 1, Aug. 24, 2009, 12 Pages.
Kossmann, Donald, "The State of the Art in Distributed Query Processing", In ACM Computing Surveys, vol. 32, No. 4, Dec. 2000, pp. 422-469.
"Final Office Action Issued in U.S. Appl. No. 15/991,632", dated May 19, 2020, 22 Pages.
"Notice of Allowance Issued in U.S. Appl. No. 15/991,632", dated Dec. 10, 2020, 10 Pages.

\* cited by examiner

UNIFIED DATA ORGANIZATION FOR MULTI-MODEL DISTRIBUTED DATABASES

CROSS-REFERENCE TO RELATED APPLICATIONS

This application is a continuation of, and claims priority under 35 U.S.C. §§ 119-120 to, U.S. Patent Application No. 62/668,226, entitled "DISTRIBUTED DATABASES," filed on May 7, 2018, the entirety of which is hereby incorporated by reference as if fully rewritten herein.

BACKGROUND

Within the field of computing, many scenarios involve a database that is represented according to a particular database model, such as a row- or column-oriented relational store; an object store; a document-oriented store; a graph store; and a key/value store. The particular database model of the database may exhibit a variety of features. As a first example, a database model may enforce an organization of the data according to a particular schema, which may be either specified by an administrator or inferred from the structure of the data, or may accept and store schemaless data for which the schema is neither specified nor apparent. As a second example, a database model may promote performance and scalability by generating indexing on selected properties, and/or utilizing caching to expedite results for frequent queries. As a third example, a database model may facilitate querying according to one or more query languages, such as a variant of the Structured Query Language (SQL) or the XML Path Language (XPath). The model of a database may be selected according to the type of data stored therein, and the semantic associations thereamong.

Databases typically exhibit a data storage model according to the selected database model. For example, a row-oriented database may store data as a sequence of rows that represent the respective records, while a columnar database may store data as a sequence of values for the respective rows of each column or attribute of a table. An object- or document-oriented database may retain objects and/or documents in a native item format, and may generate metadata representing the contents of individual objects or documents to facilitate query processing. A graph store may store a set of nodes that are interconnected by edges with various properties. A key/value-oriented database may store a hashtable that associates keys with values.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Databases are often utilized in circumstances in which data is ported from a first database to a second database, or where data from multiple databases is merged. Such scenarios may present difficulties in reconciling differences between the database models, such as merging highly structured records of a relational table with relatively unstructured key/value data. Such scenarios may also limit the portability of data, e.g., the conversion of a database from a first model to a second model.

In such scenarios, database administrators may have to develop processes for converting the data from a first database model to a second database model, which may be a formidable task if the database is complex (e.g., translating a relational database comprising dozens tables with different relational structures). In many cases, a conversion process may simply be unavailable or too costly to develop, thus limiting the portability of the data across database models.

Presented herein are techniques for providing a database that may address some limitations imposed by representation in a particular database model. A first embodiment of the presented techniques may comprise a method of providing a database by receiving items provided in a native item format, and store the items by converting into a base representation of the item, wherein the base representation is logically equivalent to the native item format and is independent of a schema of the native item format, and storing the base representation of the item in the data set. The database may then fulfill requests to provide the item in a requested format by converting the base representation of the item into the requested format and providing the item in the requested format to fulfill the request. The database may also fulfill a query in a native query format by generating a translation of the query from the native query format into a base query format that is applicable to the base representation of the item, and applying the translation of the query to the data set.

In a second example embodiment of the presented techniques, a system for storing a data set on a server may comprise a data converter that stores an item in the data set by converting the item into a base representation of the item, wherein the base representation is logically equivalent to the native item format and is independent of a schema of the native item format and storing the base representation of the item in the data set. The system may also comprise a data provider that fulfills a request for the item in a requested format by converting the base representation of the item into the requested format providing the item in the requested format to fulfill the request. The system may also comprise a query processor that fulfills a query in a native query format by generating a translation of the query from the native query format into a base query format that is applicable to the base representation of the item and applying the translation of the query to the data set.

In a third example embodiment of the presented techniques, a server may store a data set by executing instructions that store items provided in a native item format by converting the item into a base representation of the item, wherein the base representation is logically equivalent to the native item format and is independent of a schema of the native item format, and storing the base representation of the item in the data set. The server may further execute instructions that cause the server to fulfill a request to provide the item in a requested format by converting the base representation of the item into the requested format providing the item in the requested format to fulfill the request. The server may further execute instructions that cause the server to fulfill a query in a native query format by generating a translation of the query from the native query format into a base query format that is applicable to the base representation of the item, and applying the translation of the query to the data set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
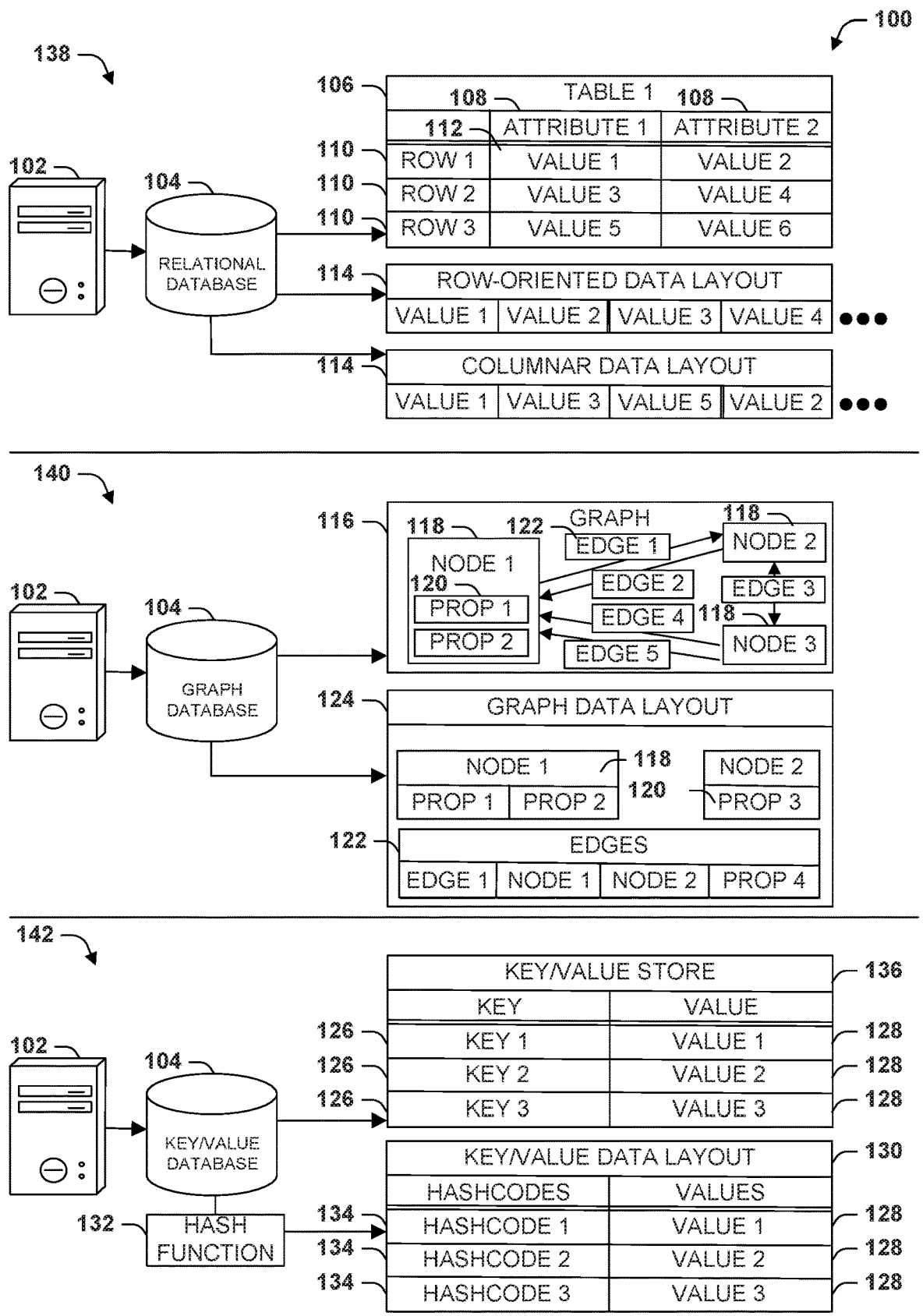
FIG. 1 is an illustration of a set of example scenarios respectively featuring a selection of various data models of databases for various data sets.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. Introduction

Modern databases support a variety of database models that may be suitable for the data model to be stored and accessed therein. A familiar example is relational data that is organized as a set of tables, wherein respective tables comprise a set of attributes or columns that define a set of value types, and a set of records or rows that respectively provide values for the values of the attributes. Other examples of data that may be stored in a database include: documents that comprise a structured or unstructured collection of entities; graphs comprising sets of nodes (each of which may feature a collection of properties), where nodes are interconnected by various edges, which also exhibit properties such as directionality and/or cardinality; and key/value stores that associate a particular value to a particular key.

For a particular database, the choice of database model is often driven by the nature of the data set to be stored thereby, such as the number of entities, nodes, records, tuples, etc.; the complexity of the interrelationships thereamong; and the model by which such items are to be accessed, updated, and queried. Other constraints may also play a role, such as performance considerations (e.g., the anticipated volume of requests to be submitted to the database; the concurrency with which such requests are to be fulfilled; and constraints on acceptable delay in fulfilling requests and resilience of the database against data loss or inconsistency) and computational resources (e.g., whether the database is provided by a commodity processor, a robust database server, or a collection of servers that are locally and/or geographically distributed).

Other constraints affect the choice of database for a particular data set. As a first example, data to be added to the database may be received in numerous formats, such as the Extensible Markup Language (XML) or JavaScript Object Notation (JSON); may be accessed by server- and/or client-side applications in a variety of application languages, such as C, Java, JavaScript, and Python; and/or may be queried using a variety of query languages, such as a variant of the Structured Query Language (SQL); the XML Path Language (XPath); or query formats or functions that are integrated with programming languages, such as a JavaScript data query syntax. Moreover, queries provided in a selected programming language may also embed values and/or functions; e.g., a query initiated by a JavaScript application may incorporate values according to a JavaScript type system and/or may include a JavaScript user-defined function as part of the query logic. These and other constraints may guide a database administrator to select a database model from an expansive range of currently available database models.

FIG. 1 is an illustration of a set of example scenarios 100 in which a particular database model may be selected for a particular data application. In a first example scenario 138, a server 102 may store a database 104 that embodies a relational data model, in which tabular data is stored as a set of tables 106 that respectively comprise a set of attributes 108 and a set of rows 110 that respectively present a value 112 for the respective attributes 108. Even in this familiar example scenario, further choices of data models may exist that serve more particular scenarios. As a first example, the tabular data may be structured in a first data layout 114 comprising a row-oriented layout as a sequence of rows; i.e., the data layout 114 involves storing a sequence of values 112 of a first row 110 for the corresponding sequence of attributes 108, followed by a sequence of values 112 of a second row 110 for the corresponding sequence of attributes 108, etc. This data layout 114 may be advantageous for facilitating access to the complete contents of a row 110 as a unit, particularly where the order of the rows 110 is not of significant interest. Alternatively, the tabular data may be structured in a second data layout 14 as a columnar layout, comprising a first sequence of the values 112 for a first attribute 108 for all of the rows 110, followed by a second sequence of the values 112 for a second attribute 108 for all of the rows 110. A columnar data layout 114 may be advantageous, e.g., for facilitating value-based queries on a particular attribute 108 by iterating over the entire set of values 112, and in particular where the rows 110 are stored in an ordered manner. In both cases, a tabular format for the relational database 104 may be selected due to the capability of strictly defining rows 110 according to the attributes 108 of the tables 106, e.g., where each row 110 is of a single, selected type that features a consistent collection of attributes 108. The strict typing provided by a relational database 104 also facilitates a robust querying model, where clients may specify queries with comparatively sophisticated logic to retrieve records with particular relationships among the stored rows 110.

In a second example scenario 140, a server 102 may store a database 104 that embodies a graph data model, in which a graph 116 comprises a set of nodes 118 that respectively comprise a collection of one or more properties 120, and that are respectively interconnected by edges 122, which may also present properties 120 such as directionality and cardinality. The server 102 may store the graph database 104 in a data layout 124 in which the respective nodes 118 are stored as a collection of disconnected objects (along with the properties 120 of the individual nodes 118) and a collection of edges 112 that relate two or more nodes 118, including by a set properties 120 for the edge 112. A graph model for the database 104 and the associated graph data layout 124 may be motivated by the use of a data set in which nodes 118 are of many types, including unique types (which, if structured relationally, may involve a large number of tables 106 respectively comprising one or a few rows 110), and/or where the nodes 118 are loosely and/or flexibly related.

In a third example scenario 142, a server 102 may store a database 104 comprising a key/value store 136 that embodies a key/value data model, in which values 128 are assigned to and associated with keys 126. The database 104 may utilize a key/value data layout 130 such as a hashtable, in which a hash function 132 is applied to calculate hashcodes 134 of the identified keys 126 that correspond to indices in the hashtable 130, where the value 128 for a key 126 is stored at the table index of the hashcode 134 of the key 126. A key/value store 136 may be motivated, e.g., for comparatively similar and/or unstructured data sets that are anticipated to be queried only by key 126.

Still other databases 104 may utilize additional data models and accompanying data layouts. As a fourth example (not shown), a document-oriented storage system may store documents that are formatted in a document language, in which entities are hierarchically arranged according to a hierarchical language format such as a variant of Extensible Markup Language (XML) or JavaScript Object Notation (JSON). The documents may be stored by the database 104 in a native format (e.g., the originally received document) and/or may be parsed or "shredded" into constituent elements that are stored in a hierarchical manner (e.g., a tree representation of an XML document).

When providing a database 104 for an application, an administrator may have to choose among the available data models. Such availability may be limited, e.g., by the nature of the data to be stored, including the native format of the data to be stored in the database (e.g., if the database 104 is anticipated to receive JSON-formatted objects, the choice of a document-oriented storage model may provide more rapid development and lower maintenance than highly structured models, such as relational tables that depend upon regularizing the JSON-formatted objects). The choice of the administrator may be based upon the range of data models that are supported by the available server 102 and database 104 (e.g., the available database 104 may provide limited or no support for a selected data model). The choice of the administrator may also be based upon performance and scalability interests, and the capabilities of the data models to suit such interests (e.g., the availability of indexing and/or caching techniques that may suit, or not suit, the access model for the data). The choice may also be based upon the applications that are to be used to access the database 104; e.g., a primary client application or programming language used thereby may provide robust support for a relational data model, such as a schema discovery and object modeling process, but limited support for a graph model.

Figure 2:
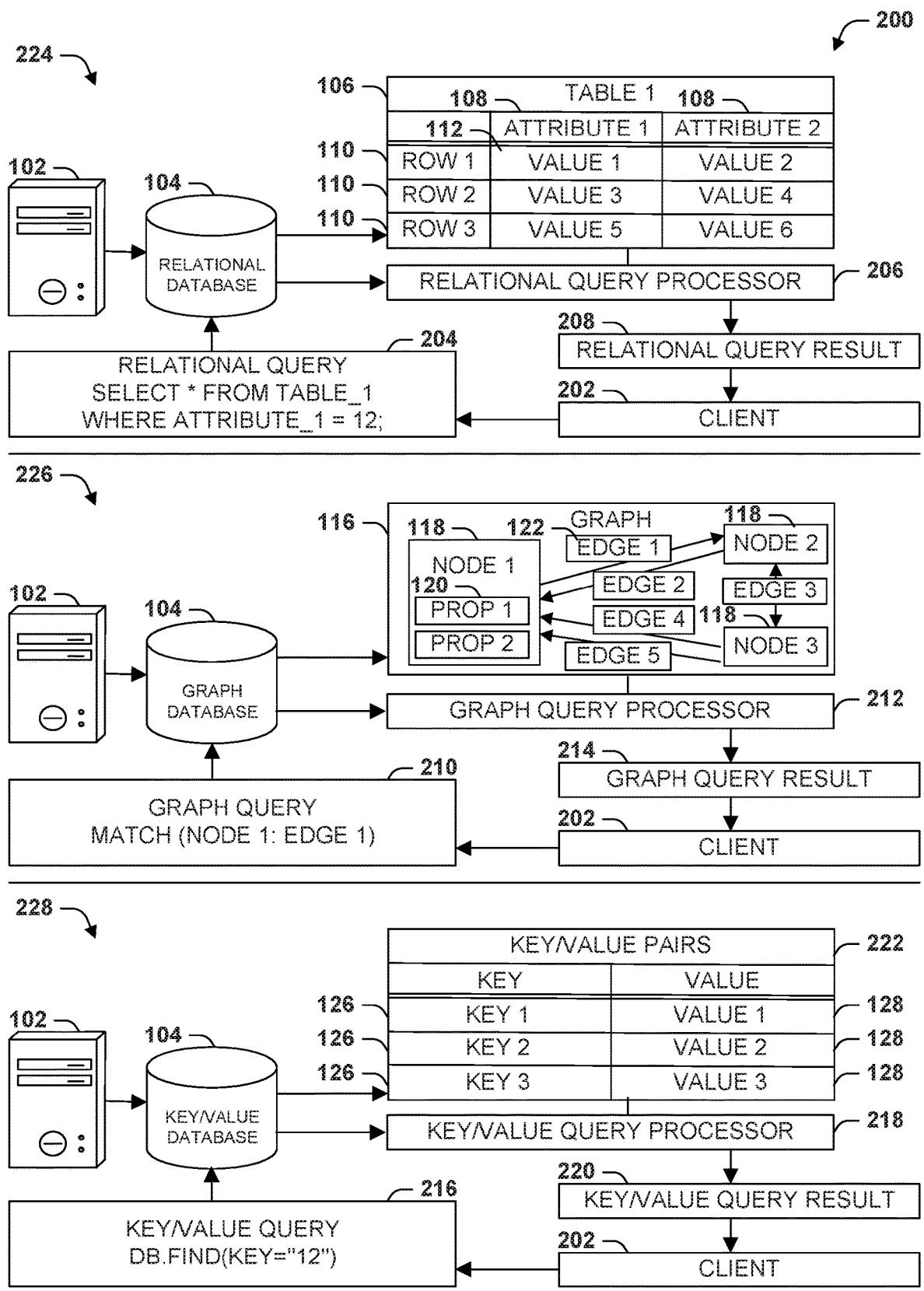
FIG. 2 is an illustration of a set of example scenarios respectively featuring an application of queries specified in various query languages to databases exhibiting various data models for various data sets.

FIG. 2 is an illustration of a set 200 of example scenarios in which particular data models have been selected according to the types of queries to be submitted to the databases 104.

In a first example scenario 224, clients 202 are anticipated to submit relational queries 204 for the data stored in the database 104 in a language such as SQL (e.g., according to the values 112 of the attributes 108 of the rows 110 of the tables 106 of the database). The database 104 may therefore utilize a relational data model, including a relational query processor 206 that processes relational queries 204 and provides a relational query result 208, such as a collection of rows 110 (respectively specified as sequences of values 112 for the respective attributes 108 for one or more tables 106).

In a second example scenario 226, clients 202 are anticipated to submit graph queries 210 for the data stored in the database 104 (e.g., requesting nodes 118 and properties 120 thereof that match a specified set of criteria of the graph, such as any nodes that are within two edges 122 of a selected node 118, either using any type of edge 122 or according to edges 122 having particular properties 120). The database 104 may therefore utilize a graph data model, including a graph query processor 212 that processes relational queries 204 and provides a graph query result 214, such as an unstructured collection of nodes 118 and the properties thereof 120 that match the criteria of the graph query 210.

In a third example scenario 228, clients 202 are anticipated to submit key/value queries 216 for the data stored in the database 104 (e.g., requesting values that are assigned to any key 126 within a specified set of keys 126). The database 104 may therefore utilize a key/value data model, including a key/value query processor 218 that processes key/value queries 204 and provides the identified values 128, such as the set of values 128 matching the identified keys 126.

In a fourth example scenario (not shown), clients 202 may be anticipated to submit document-oriented queries for the data stored in the database 104 (e.g., requesting an identification of documents that contain one or more entities of a particular type, and/or an extraction of the portions of the documents that are so identified). The database 104 may therefore utilize a document-oriented data model, including a document-oriented query processor that processes document-based queries (e.g., a parser that is capable of comparing the hierarchical structure of entities within a document to the criteria of the document query) and provides one or more documents, or excerpts thereof, in fulfillment of the query.

In these and other scenarios, administrators may be persuaded to compare and select among the available data models to generate the database 104. However, such selection may provide a number of challenges for the functionality and maintenance of the database.

As a first such example, some data applications may utilize data from a multitude of databases 104 that embody different data models, such as by porting data from a first database 104 to a second database 104, or by merging data from multiple databases 104. If the databases 104 exhibit different data models, compatibility may be problematic, such as feeding schemaless document-oriented data into a relational data model with a rigid organizational schematic structure. In some cases, portability may be limited; e.g., some entities of the document-oriented data set may be identified as compatible with some attributes 108 of some tables 106 of the relational data set, but other entities may have no corresponding representation in the relational database. When presented with such data, the server 102 may have to preserve the unmatched data in out-of-band storage, such as supplemental external storage; may have to alter the schema of the relational data set to accommodate the unstructured data; and/or may have to discard data from the document that lacks a corresponding attribute 108. None of these options is appealing.

Some techniques may be available to mitigate such difficulties. As a first example, a database 104 may permit data to be expressed in a different layout; e.g., a relational database may be natively stored in a row-oriented data layout 114, but may provide a function to express a table 106 in a columnar data layout 114. As a second example, a relational database 102 may provide an export mechanism that permits the data set to be expressed as a document, such as an XML export function. While such expression and export mechanisms may promote compatibility in some circumstances, the selective, ad-hoc nature of such mechanisms may fail to meet other applications, such as a request to interact with a relational data set in a graph data layout 124. Moreover, distinctions may arise in corresponding functions, such as import and export; e.g., a database 104 may permit a relational data set to be expressed as XML, but may provide more limited or no capabilities to import XML data into an existing relational data format, particularly if the XML schema does not match the relational schema.

As an alternative to ad-hoc import and export mechanisms, database administrators may develop conversion processes for converting the data between data models, such as a user-defined XML rendering of a relational data set. However, administrator-designed conversion may be difficult if the database is expansive, with dozens of tables featuring different relational structures. Imperfect conversion processes may result in data loss while transitioning between models; e.g., extracting data from a set of documents into a relational database may fail to preserve document content that is not fully represented within the relational schema. Moreover, the database administrator may have to update the conversion process to reflect changes to the data model. For example, addition of tables or relationships in a source relational database may have to be reflected by updating the conversion process to include the additions in the converted data set. Failure to do so, or failure to update the conversion process accurately, may result in non-analogous converted data. Moreover, the database administrator may have to contend with multiple versions of the source database and to provide ad-hoc conversion processes for each database. In many cases, a conversion process may simply be unavailable or too costly to develop, thus limiting the portability of the data across data models.

B. Presented Techniques

The limitations noted above suggest the existence of gaps in database technology for facilitating data storage, conversion, and provision, as well as other processes such as querying, in a manner that embodies a variety of data models but that is not confined to a particular model. That is, it may be desirable to configure databases where the data representation and layout are not based upon a selected data model, but may be cross-compatible with a wide variety of data models, including new data models that may be provided in the future. It may also be desirable to enable cross-compatibility of querying, e.g., where queries against the data set may be specified in multiple languages, and where query results may be provided in a selected format. Moreover, it may be advantageous to provide a database that is capable of accepting and presenting such multi-model data and fulfilling such multi-model queries in a manner that is not differentially limited by a native format preference of the database (e.g., a relational database that performs well for relational data and relational queries, but that exhibits performance limitations for processing document-oriented data and queries) and/or by the selective, ad-hoc export capabilities of the database 104.

Figure 3:
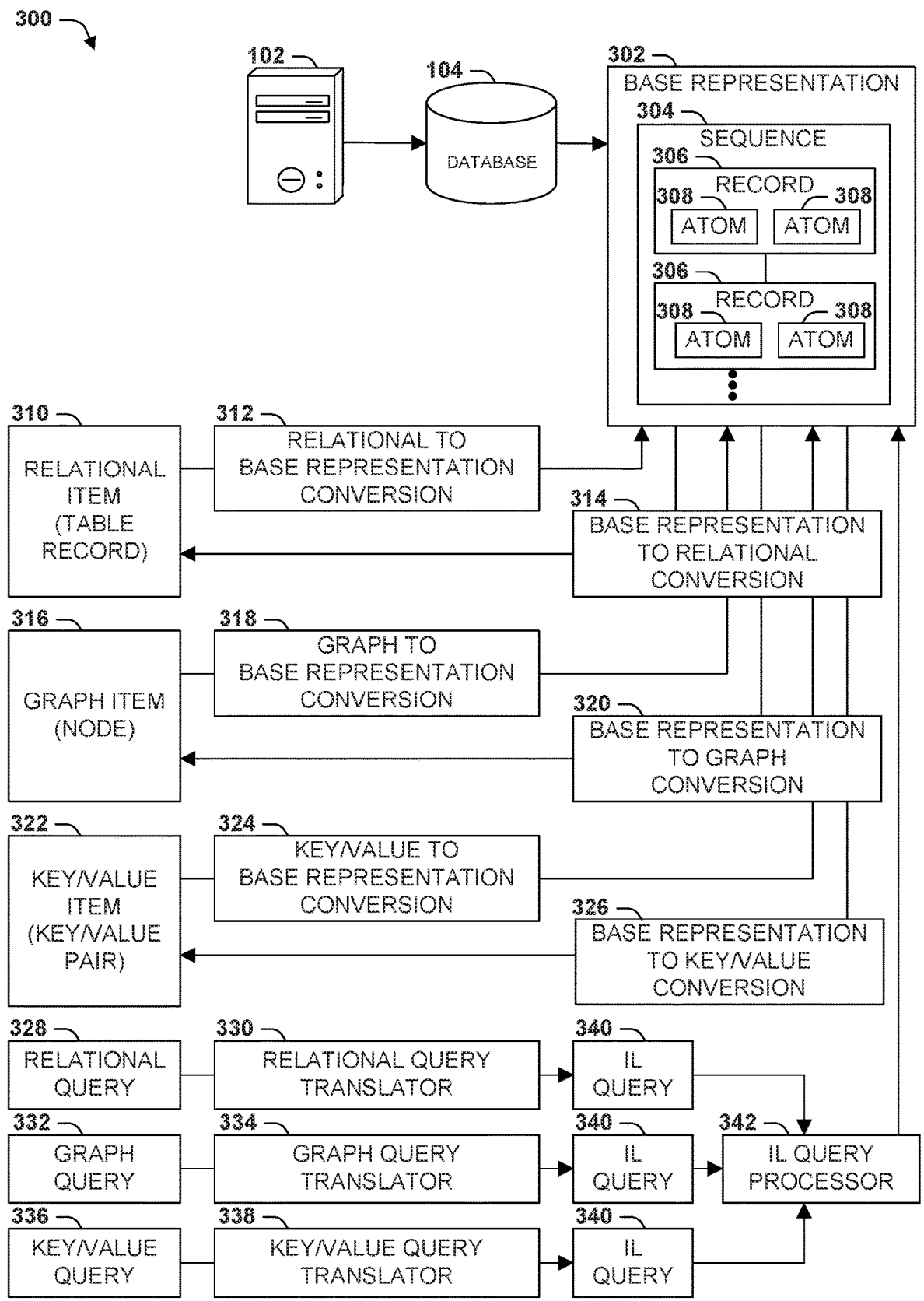
FIG. 3 is an illustration of an example scenario featuring conversion of items between a native item format and a base representation for storage and retrieval from a data set, and a presentation of queries that are respectively translated into a query intermediate language for application to the base representations of the items, in accordance with the techniques presented herein.

FIG. 3 is an illustration of an example scenario 300 of a database 104 provided according to some of the techniques presented herein. In this example scenario 300, a server 102 provides a database 104 that stores data in a base representation that is independent of any particular data model. In the particular example scenario 300 of FIG. 3, the base representation comprises an atom-record-sequence ("ARS") model, in which an item to be stored in the database is represented as a collection of atoms 308 (e.g., primitive values, optionally including a label, name, and/or type specifier) that comprise a record 306. Records 306 may also be nested, such as a first record that contains, as atoms 308, one or more sub-records 306 that respectively contain atoms 308 or other sub-records 306. Additionally, any atom 308 may be represented as a one-dimensional sequence 304 of records 306 and/or atoms 308. Using such a base representation 302, the database 104 may store a variety of items that are provided according to different data models.

When in item is received, the server 102 may convert the item into a base representation 302 of the item, wherein the base representation 302 is logically equivalent to the native item format, and is independent of a schema of the native item format, such as the atom-record-sequence representation. For example, the atom-record-sequence model may capture the full scope of semantic data that is exhibited by a relational data model—e.g., the number and organization of the tables; the sequence and attribute values of the records; and the foreign-key relationships—while also not being bound to the native relational format of the record.

As a first example, a relational item 310 (e.g., a table record of a table) may be received and converted, via a relational to base representation conversion 312, into the base representation 302, and stored in the database 104. As a second example, a graph item 316 (e.g., a node 118 of the graph 116, optionally including its properties 120 and/or edges 122) may be received and converted, via a graph to base representation conversion 318, into the base representation 302, and stored in the database 104. As a third example, a key/value pair 222 (e.g., a first piece of data serving as the key 126 and a second piece of data serving as the value 128 to be assigned to the key 126) may be received and converted, via a key/value pair 222 to base representation conversion 324, into the base representation 302, and stored in the database 104.

When an item is requested to be provided by the database 104, a reverse conversion process may be applied to convert the item into a requested format. Responsive to such a request, the database 104 may convert the base representation 302 of the requested item into the requested format and provide the item in the requested format to fulfill the request.

As a first example, a request for a relational item 310 (e.g., a table record of a table) may be received, and the identified item 310 may be retrieved in the base representation 302 in which it is stored by the database 104 and converted, via a base representation to relational conversion process 314, into a relational record that is provided to fulfill the request. As a second example, a request for a graph item 316 (e.g., a node 118 of a graph 116) may be received, and the identified item 310 may be retrieved in the base representation 302 in which it is stored by the database 104 and converted, via a base representation to graph conversion process 320, into an item of the graph 116 that is provided to fulfill the request. As a third example, a request for a key/value pair 222 (e.g., the value 128 assigned to a particular key 126) may be received, and the identified item 310 may be retrieved in the base representation 302 in which it is stored by the database 104 and converted, via a base representation to key/value conversion process 326, into a key/value pair 222 that is provided to fulfill the request.

When a query is received that is to be applied to the database 104, the query may be specified in a native query format. The database 104 may identify the native query format of the query; generate a translation of the query from the native query format into a base query format that is applicable to the base representation 302 of the items of the data set; and apply the translation of the query to the data set.

As a first example, a relational query 328 may be received, e.g., a query formatted in a variant of the Structured Query Language (SQL), and may be translated via a relational query translator 330 into an intermediate-language query 340, comprising a sequence of query intermediate language instructions that logically execute the query over the data set. A graph query 332 may be received, e.g., a query that requests one or more items that match some criteria of a graph representation of the data set, and may be translated via a graph query translator 334 into an intermediate-language query 340, comprising a sequence of query intermediate language instructions that logically execute the query over the data set. A key/value query 336 may be received, e.g., a query that requests the values 128 of keys 126 having a particular property (e.g., any keys 126 within the range of 1,000 to 1,100), and may be translated via a key/value query translator 338 into an intermediate-language query 340, comprising a sequence of query intermediate language instructions that logically execute the query over the data set. All such intermediate-language queries 340 may be provided to an intermediate-language query processor 342 that executes the instruction sequence of the intermediate-language query 340 against the base representations 302 of the items of the data set. Query results may be returned, e.g., using a relational conversion process 114; a graph conversion process 320; and/or a key/value conversion process 326. In this manner, the database 104 in the example scenario 300 of FIG. 3 provides data-model-agnostic storage, retrieval, and querying to a data set irrespective of the data model upon which such requests are based in accordance with the presented techniques.

C. Technical Effects

A first technical effect that may arise from the techniques presented herein involves the cross-compatibility of a data set and/or database 104 with a wide variety of data models. For example, a particular database 104 using a base representation 320 may receive and store relational items 310, graph items 316, and/or key value items 322 without having to adapt the data model (e.g., the data layout) to a particular or different data model. Such databases 104 may also receive, store, and integrated data that is provided in multiple data models, such as a combination of tabular, graph, and document-oriented items. Additionally, a database 104 storing items according to a base representation 302 may provide data in any requested data model, such as structuring retrieved items as relational data (e.g., tabular data); graphs (e.g., an object-oriented collection of loosely related objects); and/or documents (e.g., formatting the sequence 304 of records 306 of atoms 308 as a collection of hierarchical data, such as an XML document). Moreover, because data items may be received in and provided according to any requested data model, databases 104 of disparate data models may be used in combination; e.g., the database 104 may receive relational data from a relational database 104 that stores and provides records in a tabular format, convert and store such data in the base representation 302, and provide the data through a second conversion process to a document-oriented database 104 that stores documents. As another example, the database 104 may receive both tabular, record-based relational data from a relational database 104 and documents from a document-oriented database 104, and may store both items in the base representation 302 (e.g., by converting both items into an atom-record-sequence format).

A second technical effect that may arise from the techniques presented herein involves the capability to query the database 104 using a query formatted according to any data model. For example, relational data that is initially provided and received as tabular records may be converted into the base representation 302 and stored by the database 104, and then evaluated by a query specified in a document-oriented object model, such as XPath, e.g., by first converting the query into a sequence of query intermediate language (query IL) instructions that apply the logical operations of the query to the base representation 302 of the data. The flexibility of applying queries specified according to a first data model to data that was natively received in a second data model may promote the compatibility of the database 104 with a wide variety of applications that utilize different data models, as well as different programming languages (e.g., relational data may be converted to and stored in a base representation 302, and then queried by an application using an application language that provides support for document-oriented queries, such as XPath, and limited or no support for relational queries).

A third technical effect that may arise from the techniques presented herein involves preserving the semantic content of the data set through data model conversions. When data is received in a first data model (such as a document) and requested according to a second data model (such as tabular, row-based relational data), some ad-hoc export processes that endeavor to convert between the specified data models may lose some semantic value of the native data, and/or inadvertently introduce artifacts while generating the second data model. For example, a request to export a collection of document entities into a tabular format may introduce metadata that is neither apparent from nor inherent in the document, such as presumptions about the data types of the attributes of the tables that are inferred from the entities. For instance, a first entity of the document may include a value for a particular property, while a second entity of the document may omit the value. An ad-hoc export process may resolve this discrepancy by inserting a null value for the attribute of the row representing the second entity. However, such insertion may be ambiguous; e.g., it may be unclear to a consumer of the relational data whether the second entity in the document presented the property with a null value or entirely omitted the null value. Such difficulties may be alleviated in the currently presented techniques, in which the base representation 302, which is not confined to the strictures of a relational data model, may accurately reflect that the first item included a value for the property and the second item omitted the value, thus preserving the semantic representation of both entities via conversion to the base representation 302. When a request or query is later received that covers the second item through a relational data model, the request or query may specify how such omission is to be rendered as relational data. Because the semantic value of the second entity in the native document data model format is preserved through the base representation 302, the later retrieval and/or evaluation of the corresponding item in the base representation 302 may be specified in the context of the request and/or query.

A fourth technical effect that may arise from the techniques presented herein involves an alleviation of cumbersome conversion and translation tasks that might otherwise fall upon database administrators and/or application and client developers. Typically, when data of a native item format of a first data model is to be retrieved and/or queried according to a second data model, an administrator or developer assumes the task of converting the data type and/or translating the query. However, such tasks may be onerous, difficult, and/or time-consuming. Such an individual has to be proficient and fully informed of both the native item format and the native data model (e.g., relational data in general, and the native relational schema of the data set) as well as the target data model (e.g., the document-oriented storage system), and has to develop specific translation and/or conversion processes. Because errors or omissions in such processes may lead to data loss or corruption and/or logical errors such as incorrect query responses, such development may be painstaking and/or difficult, particularly for complex databases 104 and/or data sets. Moreover, as the data models of the native item format and/or the target data model change, the conversion and/or translation processes have to be updated to remain in synchrony with the format. Multiple such changes may create versioning conflicts that are even more difficult to manage. By contrast, database designs that convert incoming data from a native item format into a base representation 302 using automated conversion processes, and that fulfill requests and evaluate queries according to different data models using automated conversion and/or query translation processes, may faithfully reflect the details of the respective data models and therefore fulfill requests in a manner that is less prone to logical errors and/or data corruption. Many such advantages may arise from the storage of data in databases 104 based upon a base representation 302 in accordance with the techniques presented herein.

D. Example Embodiments

Figure 4:
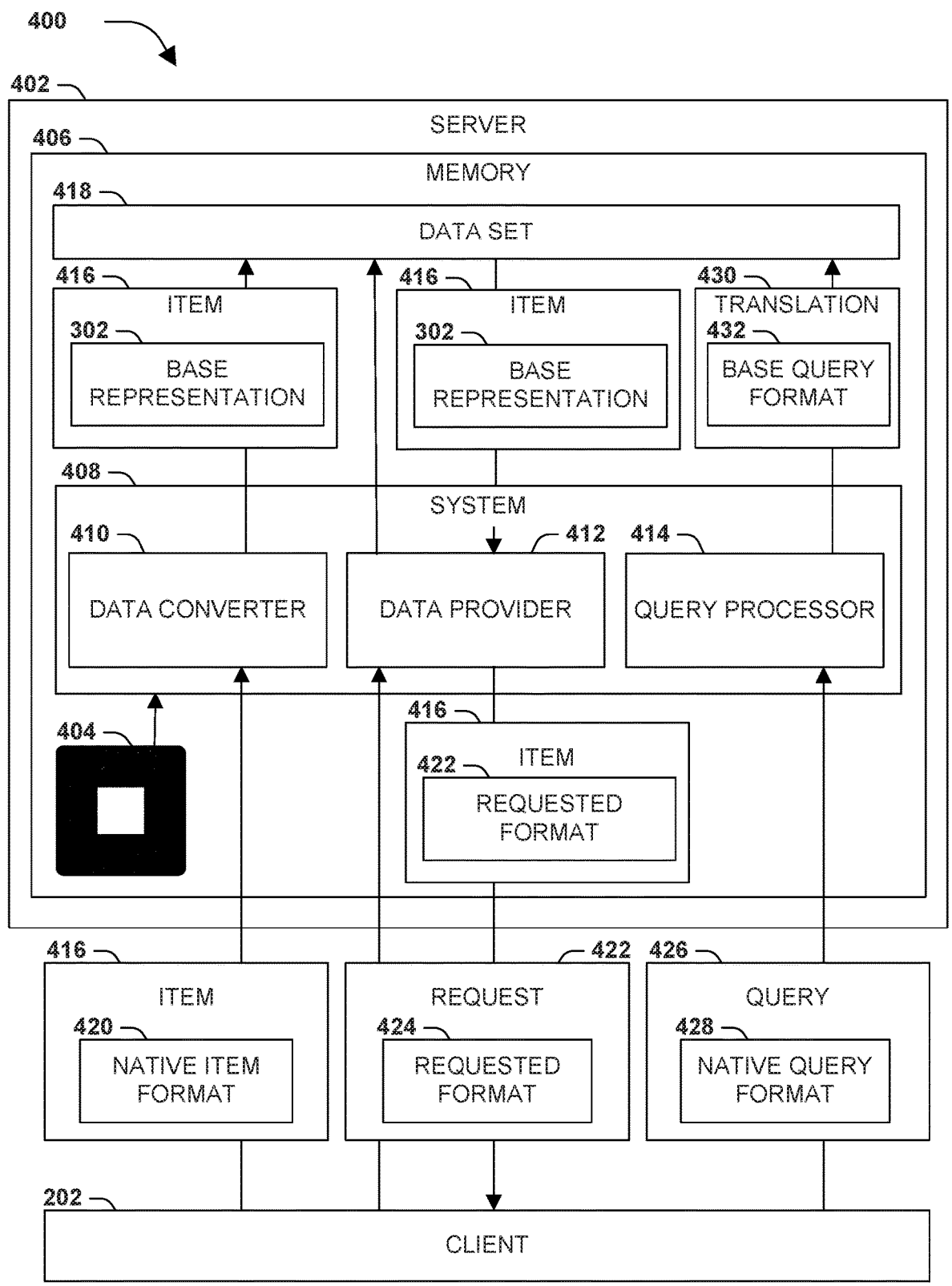
FIG. 4 is a component block diagram illustrating an example server featuring an example system for providing a database using a base representation in accordance with the techniques presented herein.

FIG. 4 is an illustration of an example scenario 400 featuring some example embodiments of the techniques presented herein, including an example server 402 that provides a database 104, and an example system 408 that causes the server 402 to provide a data set 418, such as a database 104. The example server 402 comprises a processor 404 and a memory 406 (e.g., a memory circuit, a platter of a hard disk drive, a solid-state storage device, or a magnetic or optical disc) encoding instructions that, when executed by the processor 404 of the example server 402, cause the example server 402 to provide the data set 418 in accordance with the techniques presented herein.

In this example scenario 400, the example system 408 comprises a data converter 410 that stores an item 416 in a base representation 302. More particularly, the item 416 is provided (e.g., by a client 202) in a native item format 418, such as a row 110 or table 106 of a relational database; a graph 116 comprising a set of nodes 118 interconnected by edges 122; a key/value pair 222 comprising a key 126 and a value 128 to be associated with the key; and/or a document comprising a hierarchical arrangement of nodes. The data converter 410 stores the item 416 in the data set 418 by converting the item 416 into a base representation 302 of the item 416, wherein the base representation 302 is logically equivalent to the native item format 420 and is independent of a schema of the native item format 420. The data converter 410 also stores the base representation 302 of the item 416 in the data set 418. The example system 408 also comprises a data provider 412, which fulfills a request 422 for the item 416 in a requested format 424 (e.g., a request to provide the item as a row 110 or table 106 of a relational database; as a graph 116 or a node 118 of a graph 116; as a key/value pair 222; and/or as a document such as an XML or JSON document). The data provider 412 converts the base representation 302 of the item 416 into the requested format 424 and provides the item 416 in the requested format 424 to fulfill the request 422. The example system 408 also comprises a query processor 414 that fulfills a query 426 in a native query format 430 by generating a translation 430 of the query 426 from the native query format 430 into a base query format 432 that is applicable to the base representation 302 of the item 416, and applying the translation 430 of the query 426 to the data set 418. In this manner, the example system 408 enables the example server 402 to provide the data set 418 in accordance with the techniques presented herein. However, it is to be appreciated that a server embodying the presented techniques may also include instructions that are organized in a different manner than the example system 408 (e.g., providing more or fewer components, and/or organizing the elements of the presented techniques in a different structure or order), while still functioning in a similar manner as the example server 402 in the example scenario 400 of FIG. 4.

Figure 5:
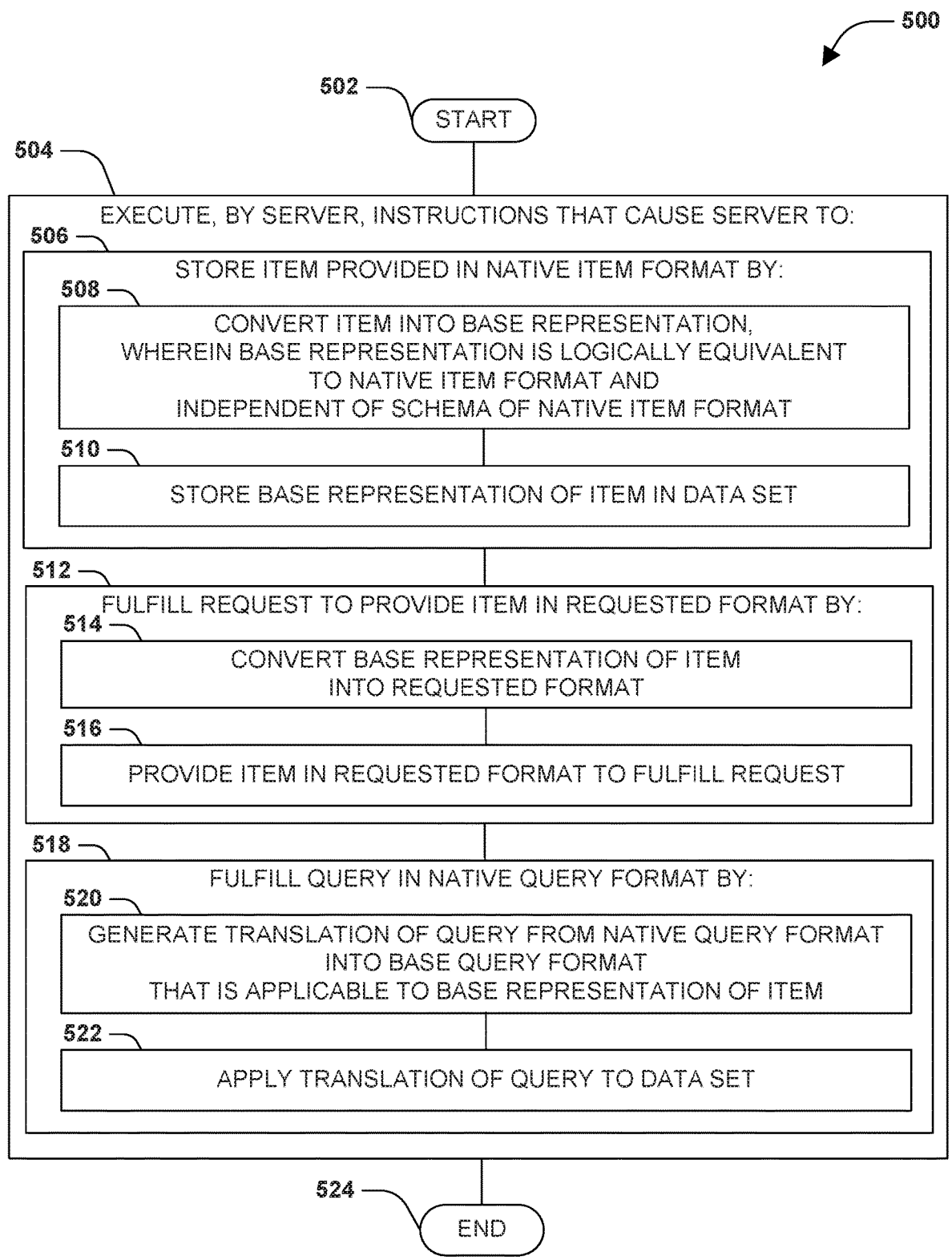
FIG. 5 is a flow diagram illustrating an exemplary method of providing a database using a base representation in accordance with the techniques presented herein.

FIG. 5 is an illustration of an example scenario featuring a third example embodiment of the techniques presented herein, wherein the example embodiment comprises an example method 500 of providing a data set 418 in accordance with techniques presented herein. The example method 500 involves a device comprising a processor 404, and may be implemented, e.g., as a set of instructions stored in a memory 406 of the device, such as firmware, system memory, a hard disk drive, a solid-state storage component, or a magnetic or optical medium, wherein the execution of the instructions by the processor 404 causes the device to operate in accordance with the techniques presented herein.

The first example method 500 begins at 502 and involves executing 504, by the server, instructions that cause the server to perform in the following manner. The execution of the instructions causes the server to store 506 an item 416 provided in a native item format 420 by converting 508 the item 416 into a base representation 302 of the item 416, wherein the base representation 302 is logically equivalent to the native item format 420 and is independent of a schema of the native item format 420, and storing 510 the base representation 302 of the item 416 in the data set 418. The execution of the instructions also causes the server to fulfill 512 a request 424 to provide the item 416 in a requested format 424 by converting 514 the base representation 302 of the item 416 into the requested format 424 and providing 516 the item 416 in the requested format 424 to fulfill the request 422. The execution of the instructions also causes the server to fulfill 518 a query 426 in a native query format 430 by generating a translation 430 of the query 426 from the native query format 430 into a base query format 432 that is applicable to the base representation 302 of the item 416 and applying 522 the translation 430 of the query 426 to the data set 418. In this manner, the example method 500 may enable the server to provide a data set 412 in accordance with the techniques presented herein, and so ends at 524.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
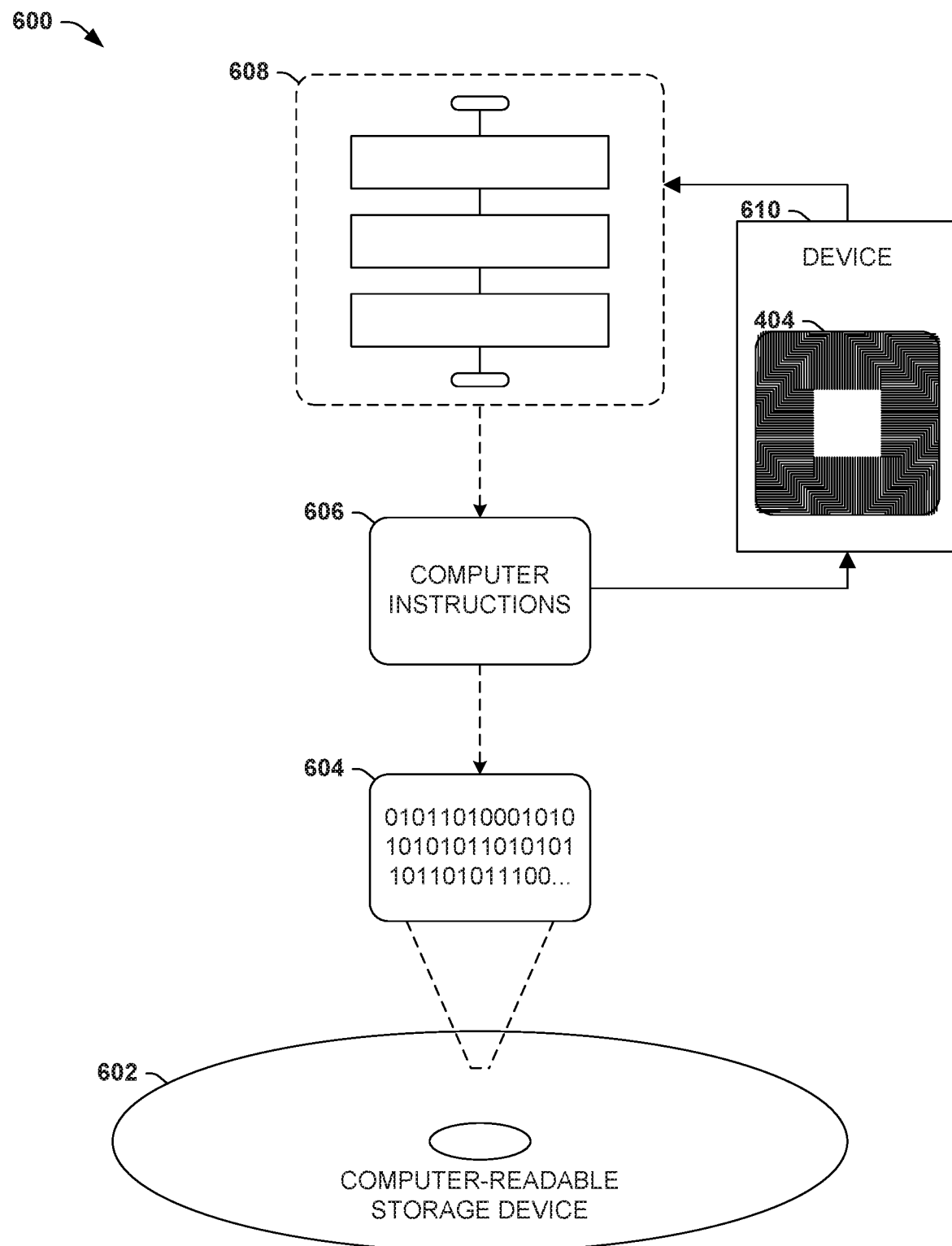
FIG. 6 is an illustration of an example computer-readable medium storing instructions that provide an embodiment of the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 404 of a server, cause the server to operate according to the principles set forth herein. For example, the processor-executable instructions 606 may encode a system that provides a data set 418 to clients 202, such as the example system 408 of FIG. 4. As another example, the processor-executable instructions 606 may encode a method of providing a data set 418 to clients 202, such as the example method 500 of FIG. 5. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the first example method of FIG. 4; the second example method of FIG. 5; and the example device 602 and/or example method 608 of FIG. 6) to confer individual and/or synergistic advantages upon such embodiments.

E1. Scenarios

A first aspect that may vary among implementations of these techniques relates to scenarios in which the presented techniques may be utilized.

As a first variation of this first aspect, the presented techniques may be utilized with a variety of servers 102, such as workstations, laptops, consoles, tablets, phones, portable media and/or game players, embedded systems, appliances, vehicles, and wearable devices. The server may also comprise a collection of server units, such as a collection of server processes executing on a device; a personal group of interoperating devices of a user; a local collection of server units comprising a computing cluster; and/or a geographically distributed collection of server units that span a region, including a global-scale distributed database. Such devices may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication). Additionally, such databases 104 may be accessed by various clients 202, such as a client process on the server 102 storing the database 104; other servers 102 within a server group that includes the database 104; and/or various client devices that utilize the server 102 and/or server group on behalf of one or more users and/or other devices.

As a second variation of this first aspect, the presented techniques may be utilized with a variety of data and databases 104 featuring a variety of data models, such as a relational database comprising tabular data organized into tables 106 comprising sets of attributes 108 and sets of rows 110 presenting values 112 for the respective attributes 108; graph data comprising a graph 116 of nodes 118 with interconnecting edges 122; key/value pairs 222 of keys 126 and associated values 128; and documents provided as structured or unstructured collections of entities. Such databases 104 may also be used in a variety of circumstances, such as data warehousing; content provided through a content system such as a webserver; and object systems for an application or operating system. Some databases 104 may comprise a hybrid of several data models, which may be aggregated in a horizontal manner (e.g., a collection of items 416 of which some items 416 are provided and/or requested in a first native item format 420, such as relational data, and other items 416 are provided and/or requested in a second native item format 420, such as entities within documents) and/or non-horizontal manner (e.g., a collection of items in a first native item format 420, such as entities within documents, may be described by metadata represented by other items 416 provided in a second native item format 420, such as relational data).

As a third variation of this first aspect, the presented techniques may be utilized with queries 202 of many types, including many native query formats 430. For example, the queries 202 may comprise relational queries in a language such as a variant of the Structured Query Language (SQL); graph queries that specify nodes 112 and/or edges 122 of a graph 116, such as GraphQL queries; key/value queries that request the values 128 associated with a particular subset of keys 126, such as NoSQL queries; and/or document-oriented queries that request documents and/or entities thereof that meet certain criteria, such as Extensible Path Language (XPath) queries. Additionally, the queries may be specified in a query format of an application language that is utilized by an application of the client 202, such as a JavaScript Query Language (JQL) query or a Language Integrated Query (LINQ) query. Many such scenarios may be identified in which the techniques presented herein may be advantageously utilized.

E2. Base Representation and Conversion

A second aspect that may vary among embodiments of the presented techniques involves the base representation 302 in which the items 416 are stored in the data set 418.

As a first variation of this third aspect, the base representation 302 may comprise an atom-record-sequence representation of the item 416, where the atoms 308 correspond to primitive values (e.g., Boolean values, integers, floating-point numbers, characters, and strings), optionally including a label, name, and/or type specifier; the records 306 correspond to ordered collections of atoms 308, such as the members of an object; and the sequences 304 correspond to arrays of records 306 and/or atoms 308. In some scenarios, atoms 308 may comprise records 306 or sequences 304, which may enable nesting, such as where records 306 encapsulate other records 306 and/or sequences 304 of records 306 and/or atoms 308. In some scenarios, a hierarchical arrangement of atoms 308, records 306, and/or sequences 304 may be consistently represented in and by the data layout; in other scenarios, atoms 308, records 306, and/or sequences 304 may be distributed and interconnected by absolute or relative memory references. In some scenarios, relationships may be represented as identifiers and/or memory references stored in one sequence 304, record 306, and/or atom 308 that respectively reference another sequence 304, record 306, and/or atom 308; in other scenarios, relationships may be represented separately from the data layout of the sequences 304, records 306, and/or atoms 308. In some scenarios, sequences 304, records 306, and/or atoms 308 may be further annotated with values, such as an identifier or metadata describing various properties, such as the data source and/or native item format 420 of the item 416. This limited collection of logical data types may be sufficient to reflect the fundamental logical organization of the items 416 in the native item format 420, such as the basic contents and interrelationships of records in a relational database. Moreover, the atom-record-sequence arrangement of the data set may comprise an organizational structure, such as a tree representation, wherein storing the base representation 302 of an item 416 in the data set further comprises appending the atom-record-sequence representation 302 of the item 416 to a tree organization of base representations 302 of the items 416 of the data set. When represented as a tree structure, the data set may comprise a set of nodes that are arranged according to a schema of the data set (e.g., representing the hierarchical relationships, such as encapsulation within a record 308 and/or ordering within an array 304), and a set of leaves that are respective appended to the nodes and that comprise instance values of the items 416 of the data set (e.g., the atoms 308 of the atom-record-sequence format).

Figure 7:
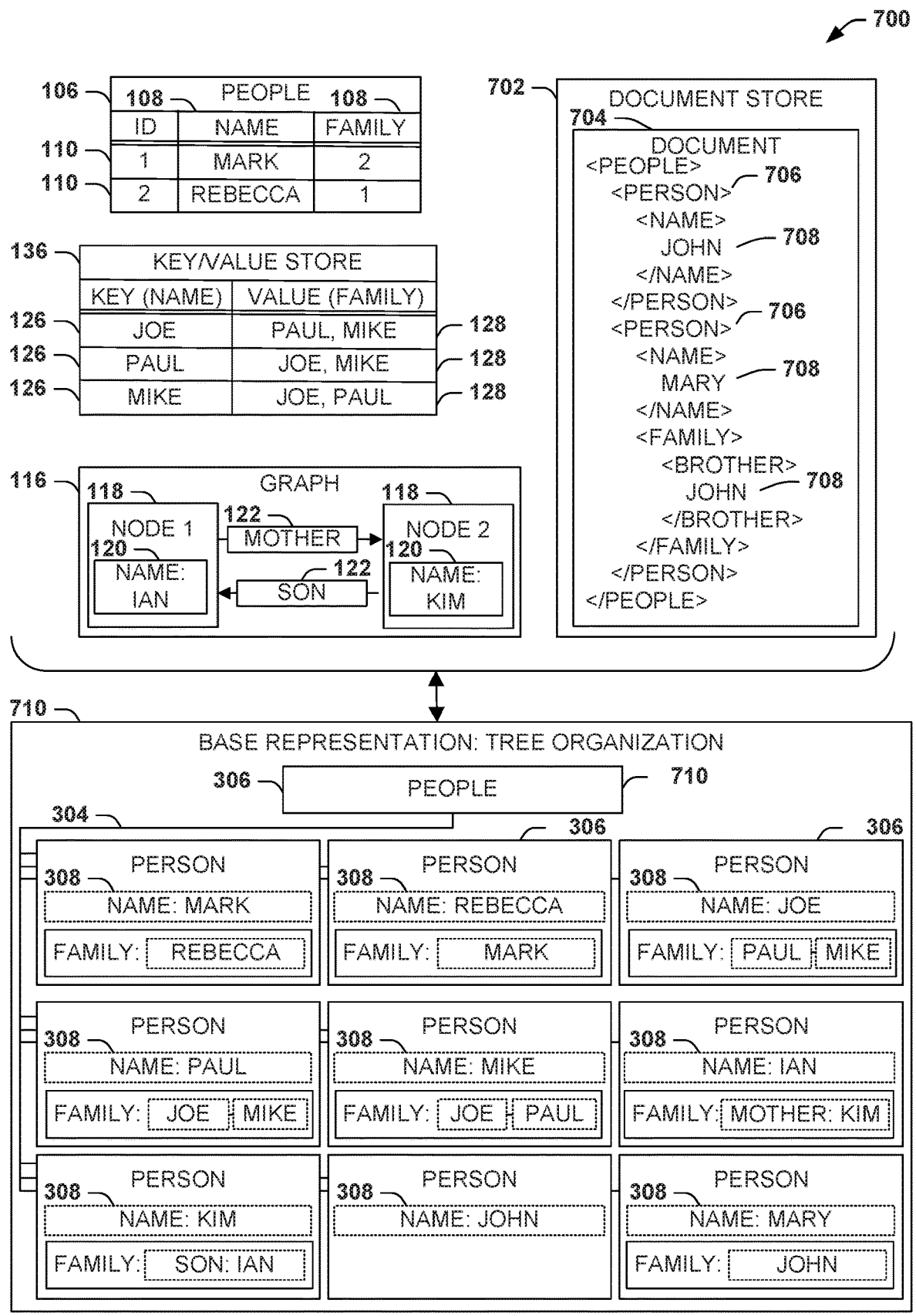
FIG. 7 is an illustration of an example scenario featuring a conversion of items in a variety of data models into a tree organization in accordance with the techniques presented herein.

FIG. 7 is an illustration of an example scenario 700 featuring a conversion of a variety of items 416, formatted according to various data models, into a tree organization 710 that serves as the base representation 302 of all such items 416, irrespective of the native item format 420 in which such items 416 are provided. In this example scenario 700, a first set of items 416 is provided in a relational table 106 comprising a set of rows 110 and values 112 for respective attributes 108 of the table 106. A second set of items 416 is provided as a key/value store 136 comprising keys 126 that are associated with values 128. A third set of items 416 is provided as a graph 116 of nodes 118 that are interconnected by edges 112, and that include properties 1120 in both the nodes 118 and edges 122. A fourth set of items 416 is provided as a document store 702 comprising a document 704 featuring a collection of entities, including a collection of nodes 706 providing a hierarchical structure and instance values 708 positioned within. Although sharing a common theme, the items 416 of the different native item formats 420 exhibit some nuances and variations. As a first example, the edges 122 of the graph 116 may include a property 120 that indicates the nature of a familial relationship. As a second example, the people of the relational table 106 may be interrelated through a key reference attribute that stores an identifier of the related record. As a third example, the key/value store 136 may represent the familial relationships as an array that is packed into the value 128 associated with a key 126 representing the name. As a fourth example, the document store 702 may include an instance value 708 in a second node 706 indicating a familial relationship with the entity represented by the first node 706, but may omit, in the first node 706, a corresponding instance value 708 indicating a familial relationship with the entity represented by the second node 706. Such inconsistency may be accidental (e.g., the represented individual may have inadvertently skipped this entry) or deliberate (e.g., the represented individual may have chosen not to disclose familial relationships), but either way, the semantic value may be preserved in the base representation 302.

Despite the disparate data models and nuances exhibited by the native item formats 420 of these items 416, a conversion of the respective items 416 into a base representation 302 may unify the items 416 into a shared common format that preserves the semantic representations of each such item 416. The base representation 302 comprise a tree organization 710, beginning with a root node 712 comprising a "People" record 306. The "People" record 306 comprises a sequence 304 of records 306 that respectively represent the people provided in the respective sets of items. The respective records 306 include a first atom 308 indicating the name of each person, and a second atom 308 that is also a record 306 representing familial relationships. In some such records 306, corresponding to the native item formats 402 of the original items 416, the records 306 comprise an atom 308, such as the name or identifier of a related individual. In the instance of the missing familial relationship, the record 306 may simply omit the corresponding atom 308. For the key/value pairs of the key/value store 136 that specify familial relationships as an array, the atom 308 may comprise a record 306 that further comprises a sequence 304 of atoms 308.

In this manner, the tree organization 710 provide base representations 302 that are logically equivalent with the native item format 420 of the respective items 416, irrespective of the data model represented by the native item format 420. Moreover, the atoms 308 (represented with broken lines) represent instance values 708 as the leaves of the tree organization 710, while the sequences 304 and records 306 represent the nodes 706 that provide the structural schema of the base representation 710. In some respects, additional choices may be made in the conversion of the representations that may preserve and/or discard some portions upon which logical equivalence is not dependent. For example, in the relational table 106, the respective rows 110 further comprise an identifier value 112 of an identifier attribute 108, and the logical relationships are specified in the key relation attribute 108 by referencing the identifier of the related record. Though omitted from the example scenario 700 of FIG. 7, the identifiers may be preserved in the base representation 302 (e.g., by including atoms 308 that include the identifier values). Alternatively, the conversion may recognize that the identifiers are merely the format-specific manner in which the relational table 106 represents relationships, and that the specific values are semantically immaterial as long as the so-represented relationships are preserved in the tree organization 710.

Figure 8:
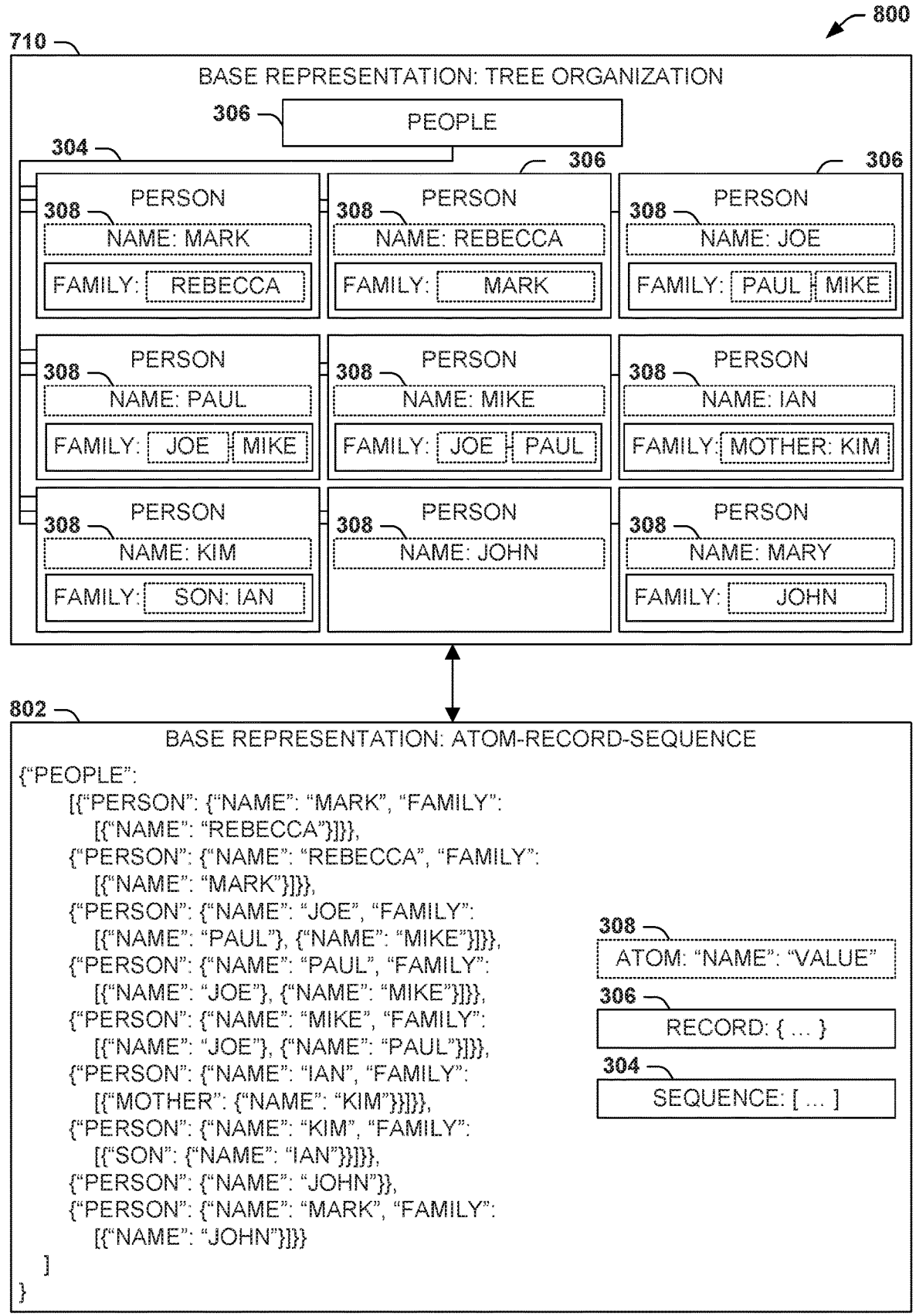
FIG. 8 is an illustration of an example scenario featuring a conversion of items in a variety of data models and a tree organization into an atom-record-sequence (ARS) base representation in accordance with the techniques presented herein.

FIG. 8 is an illustration of an example scenario 800 in which the tree organization 710 is further represented as an atom-record-sequence format 802. In this example scenario 800, atoms 308 are depicted in the atom-record-sequence format 802 as broken lines of values and labels; records 306 are depicted as curly brackets; and sequences 304 are depicted as square brackets. The atom-record-sequence format 802 embodies the structure and semantic properties of the tree organization 710, including the presentation of leaves that present instance values (e.g., as atoms 308) and nodes that provide the structure of the schema of the items 416. The base representation 804 further preserves and unifies the semantic content of the items 416 of the disparate item sets, irrespective of the native item formats 420 of the respective items.

It may be further appreciated from the comparison of FIGS. 7-8 that the base representation 302 exhibited by the tree organization 710 and the atom-record-sequence format 802 may be reversed, such that any selected item 416 from the base representation 302 may be provided, in response to a request 422 specifying a requested format 424, by converting the item 416 into the represented format. For example, after the "Mary" and "John" items 416 that are originally provided as entities of the document store 702 are converted into the base representation 302 and stored in the data set, a request 422 to provide the items in a different requested format 424—e.g., as rows 110 of a relational table 106, as key/value pairs of a key/value store 136, or as interconnected nodes 118 of a graph 116—may be fulfilled by applying the reverse process, in view of the requested format 424. For instance, a relational table 106 may be generated that converts the requested items 416 into rows 110. Moreover, the request 422 specifying the requested format 424 may further indicate details of the conversion that address any discrepancies between the native item format 420 and the requested format 424. For example, in the context of the missing familial relationship of the "John" entity, the request 422 may specify whether the converted relational table 106 is to include a "family" attribute 108 with a null value for this entity, or whether the converted relational table 106 is to omit a "family" attribute 108 and instead provide a second relational table 106 that provides the familial relations, which includes a row 110 relating "Mary" to "John" but does not include a row 110 relating "John" to "Mary." In this manner, the semantic content of the items 416 is preserved in the base representation 710, and discrepancies may be resolved a part of the request 422.

The conversion of items 416 into the base representation 302 may include a variety of other techniques. As a first such example, for an item 416 further comprising an array of at least two values, the conversion of the item 416 into the base representation 302 may involve generating an array container node, and for the respective values of the array, appending, to the array container node, a child node for the value. In some such scenarios, the appending may include appending, to the array container node, a child node comprising an array index of the value; and appending, to the child node, a grandchild node comprising the value. That is, between the array container node and the node for the item contained at an array index, a tree organization 710 may insert an additional node that specifies the array index. Such insertion may preserve the array order of the items 416 in the native item format and/or may facilitate lookup. As a second such example, where an item 416 further comprises a key/value pair, the conversion of the item 416 into the base representation 302 may further comprise appending, to a selected node of the tree organization, a child node comprising a key of the key/value pair; and appending, to the child node, a grandchild node comprising a value of the key/value pair. That is, the leaf representing the value 128 may depend from a node representing the key 126. Alternatively, the key and node may be included together in a node, such as the label and value combinations depicted in the example scenario 700 of FIG. 7. Many such variations may be enabled by the base representations 302 of the items 416 in accordance with the techniques presented herein.

E3. Query Translation

A third aspect that may vary among embodiments of the techniques presented herein involves the translation 430 of queries 426 into a base query format 432 that is applicable to the base representations 302 of the items 416.

As a first variation of this third aspect, the base query format 432 of the translation 430 may comprise a sequence of query intermediate language instructions that logically execute the query over the data set. For example, the query intermediate language instructions may be selected of a query intermediate language format to which the native query formats 430 may be readily translated, and which provides operations that are logically equivalent to the operations provided in the native query formats 430. As a first such example, the query intermediate language may comprise JavaScript, which includes (e.g., as part of the JavaScript Query Language (JQL)) query operators that correspond to the logical operations that are supported by a wide variety of native query formats 430, such as projection; filtering; aggregation; sorting; flattening; arithmetic, logical, and data conversion expressions; hierarchical navigation across items and data sets; and specialized query operations, such as spatial queries. JavaScript may also provide an advantageous selection as a query intermediate language due to its prevalence in applications that utilize databases, such that a significant subset of queries 426 may provide a minimal translation 430 (e.g., simply validating the JavaScript syntax). For example, the base representations 302 of the items 416 of the data set 418 may be organized according to a JavaScript Object Notation (JSON) data model, and the query intermediate language instructions may be specified according to a query intermediate language that features variable types that are consistent with JavaScript variable types, thereby providing an efficient and expedient translation 430 for a significant subset of queries 426.

As a second variation of this third aspect, the translation 430 of a query 426 from a variety of native language formats 430 may be achieved in numerous ways. As one such example, a sever 402 may provide a set of application programming interfaces (APIs) for respective native query formats 430, such as an SQL API that produces translations 430 of SQL queries 426 over a relational table 106 into the base query format 432; an XPath API that produces translations 430 of XPath document-oriented queries 426 over a document 704 into the base query format 432; and a GraphQL API that produces translations 430 of GraphQL queries 426 over a graph 116 into the base query format 432. When a query 426 is received, an embodiment of the presented techniques may examine the query 426 to identify the native query format 430 of the query 426, and may select and invoke an API that translates the identified native query format 430 of the query 426 into the base query format 432. Additionally, an embodiment of the presented techniques may include an application programming interface extender that receives a new application programming interface for a new query language to be provided by the database 104 (e.g., a LINQ API that produces translations 430 of LINQ queries 426 over a data source into the base query format 432, and adds the new application programming interface to the application programming interface set. A server 102 may therefore provide extensibility in the set of supported native query formats 430 in which queries 426 may be provided.

As a third variation of this third aspect, the base query format 432 of the translation 430, such as a query intermediate language (query IL) format, may be applied to the base representations 302 of the items 416 in a variety of ways. As a first such example, a JavaScript engine may interpret the query intermediate language format and apply the JavaScript operations to the base representations 302. However, this embodiment may exhibit limited performance and/or scalability, e.g., due to the interpreted nature of JavaScript. Instead, some embodiments may further comprise a virtual machine that executes logical operations over the data set according to a virtual instruction set architecture. The query intermediate language instructions (e.g., query IL instructions) may be further compiled into opcodes according to the logical operations of the virtual machine, and the translation 430 may be applied to the data set by executing the opcodes through the virtual machine. Compilation of the translation 430 and execution through the virtual machine may provide a performance advantage, e.g., particularly where for queries 426 that are redundantly executed over a large number of iterations (e.g., an opcode-based iteration that incrementally evaluates each of 100,000 items 416) and/or for queries 426 that are repeatedly invoked and executed, such that the compiled translation 430 of the query 426 may be cached and reused if the parameters of the query 426 have not significantly changed. As a further performance gain, some embodiments may apply a rule-based optimizer to optimize the opcodes of the query intermediate language instructions for execution by the virtual machine (e.g., removing redundant opcodes and/or unrolling simple loops to expedite iteration).

Figure 9:
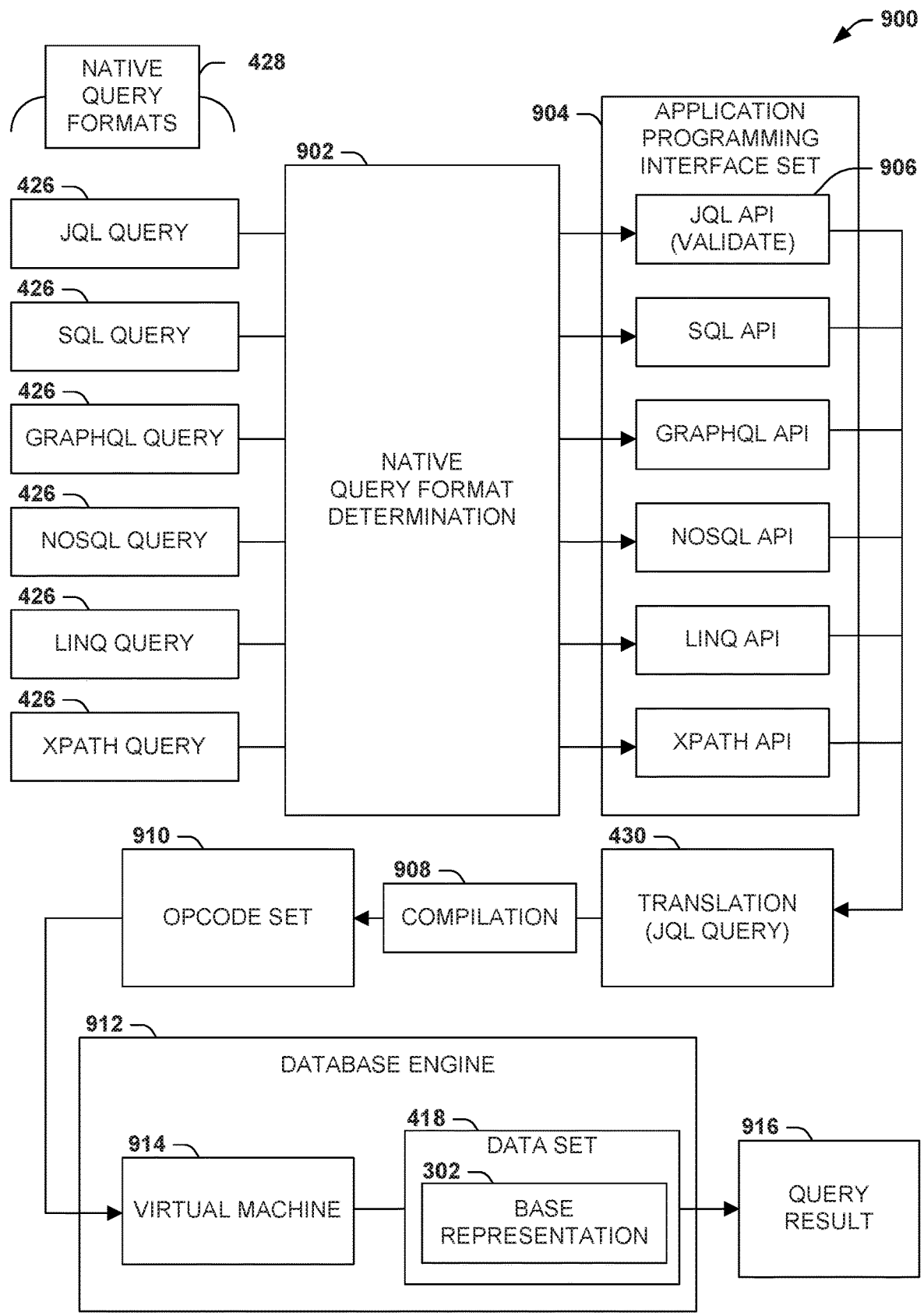
FIG. 9 is an illustration of an example scenario featuring a translation of queries using an application programming interface (API) set and compilation into opcodes for execution by a virtual machine in accordance with the techniques presented herein.

FIG. 9 is an illustration of an example scenario 900 featuring an embodiment that applies queries 426 originally specified in a variety of native query formats 428 to a data set 418 comprising base representations 302 of items 426 in accordance with the techniques presented herein. In this example scenario 900, the queries 426 are originally specified in various query languages, such as JQL, SQL, GraphQL, NoSQL, LINQ, and XPath. The respective queries 426 may be subjected to a native query format determination 902 (e.g., identifying the native query format 428 of the query 426 according to its syntax, keywords, query source such as application type, and/or the native item format 420 of the items 416 over which the query 426 is specified). The embodiment further comprises an application programming interface set 904 of application programming interfaces 906 ("APIs") for the respective native query formats 428, and that may be invoked to translate queries in the respective native query formats 428 into a translation 430 in a query intermediate language, such as a JQL query. If the native query format 428 of the query 426 is JQL, the API 906 may subject the query 426 only to a minimal translation process, such as validating the syntax of the query 426. The translation 430 may then be subjected to compilation 908 into an opcode set 910 of opcodes according to an instruction set architecture of a virtual machine 914 that is provided as part of the database engine 912, where the virtual machine 914 is capable of executing directly upon the data set 418. The opcode set 910 is therefore provided to the virtual machine, and the execution of the opcode set 910 by the virtual machine 914 on the data set 418 in the base representation 302 produces a query result 916 that may be returned to a client 202 in fulfillment of the query 426 and in accordance with the techniques presented herein.

As a fourth variation of this third aspect, the translation 430 of the query 426 into the base query format 432 may provide a number of features in the capabilities of queries 426 that are applied to the data set. Indeed, some such features may provide new capabilities that are not typically available in the native query format 430 of the query 426 as typically applied to the native item format 420 of the items 416.

As a first such example, a query 426 may further comprise a function, e.g., a user-defined function (UDF) in a JavaScript query such as a lambda expression or closure. The user-defined function may be included in the translation 430; e.g., while generating the translation 430 of the query 426, a query processor may also translate the function into a sub-sequence of query intermediate language instructions and insert the sub-sequence of query intermediate language instructions into the sequence of query intermediate language instructions of the query 426. In a still further embodiment, the user-defined function may also be compiled into opcodes that are executed by the virtual machine.

As a second example of this fourth variation, using the tree organization 710 as the base representation 302 may enable additional features in the translation 430 of some queries 426. Some embodiments may permit queries 426 that comprise a path wildcard between a first query predicate and a second query predicate (e.g., a query for a selected node 706 or selected leaf 708 of the tree organization 710, where the selected node 706 or leaf 708 further depends from a selected parent node 706). Moreover, the first query predicate and the second query predicate may be directly connected (e.g., as a parent and child node with zero intermediate nodes), or may be indirectly connected (e.g., via a chain of one or more intermediate nodes that depend from the selected parent node 706 and from which the selected node 706 or leaf 708 depends). Applying the query 426 to the data set 418 may therefore further comprise matching the first query predicate with a first node 706 of the tree organization 710, and matching the second query predicate with a child node 706 of the first node 706, wherein the first node 706 and the child node 706 are separated by at least zero intermediate nodes 706 according to the path wildcard.

As a third example of this fourth variation, the translation 430 of the query 426 may enable the evaluation of multilingual queries, comprising a first query portion that is specified in a first query language, and a second query portion that is specified in a second query language. A query processor that utilizes an application programming interface set for a variety of native query formats 430 may invoke the application programming interface by invoking a first application programming interface of the first query language to translate the first query portion into a first base query format portion, and may also invoke a second application programming interface of the second query language to translate the second query portion into a second base query format portion. The first base query format portion and the second base query format portion may then be aggregated to produce the translation 430 of the query 426. As an example, a query 426 may utilize a GraphQL syntax to specify a selection portion of the query 426, but may utilize a SQL query syntax for projection, sorting, and ordering operations. The translation of the various portion so the query 426 using the APIs for the respective native query formats 430 thereof may produce query intermediate language portions, and/or opcodes that are compiled therefrom, either of which may then be readily combined to produce a translation 430 that exhibits the logic of both portions of the multilingual query 426.

As a fourth example of this fourth variation, a query 426 may further request a query result in a requested format 424 (e.g., requesting a result set to be returned as relational data or as a graph). A query processor 414 may produce a translation 430 that produces a query result that is formatted according to the requested format 424 for return to the client 202. Alternatively or additionally, a query 426 may further request a query result to be returned using a particular communication protocol, such as XML, JSON, or SOAP. A query processor 414 may produce a translation 430 that produces a query result, and that generates a communication protocol translation of the query result (e.g., not just a document representation of the data set, but an XML-encoded document representation), and may provide the communication protocol translation of the query result to the client 202 in order to fulfill the query 426. Moreover, some embodiments may comprise a communication protocol set of communication protocols (e.g., XML protocol variants that may be specified for communication with various other devices), and may be configured to, upon receiving a new communication protocol translator for a new communication protocol into which the query result is to be translated (e.g., a new XML protocol variant that is compatible with a particular device), add the new communication protocol translator to the communication protocol translator set. Queries 426 that later request the query result in the new communication protocol may be fulfilled by retrieving and invoking the new communication protocol translator of the communication protocol set. Many such variations may be utilized to translate queries for application to a base representation, and features enabled by such translations, in accordance with the techniques presented herein.

F. Computing Environment

Figure 10:
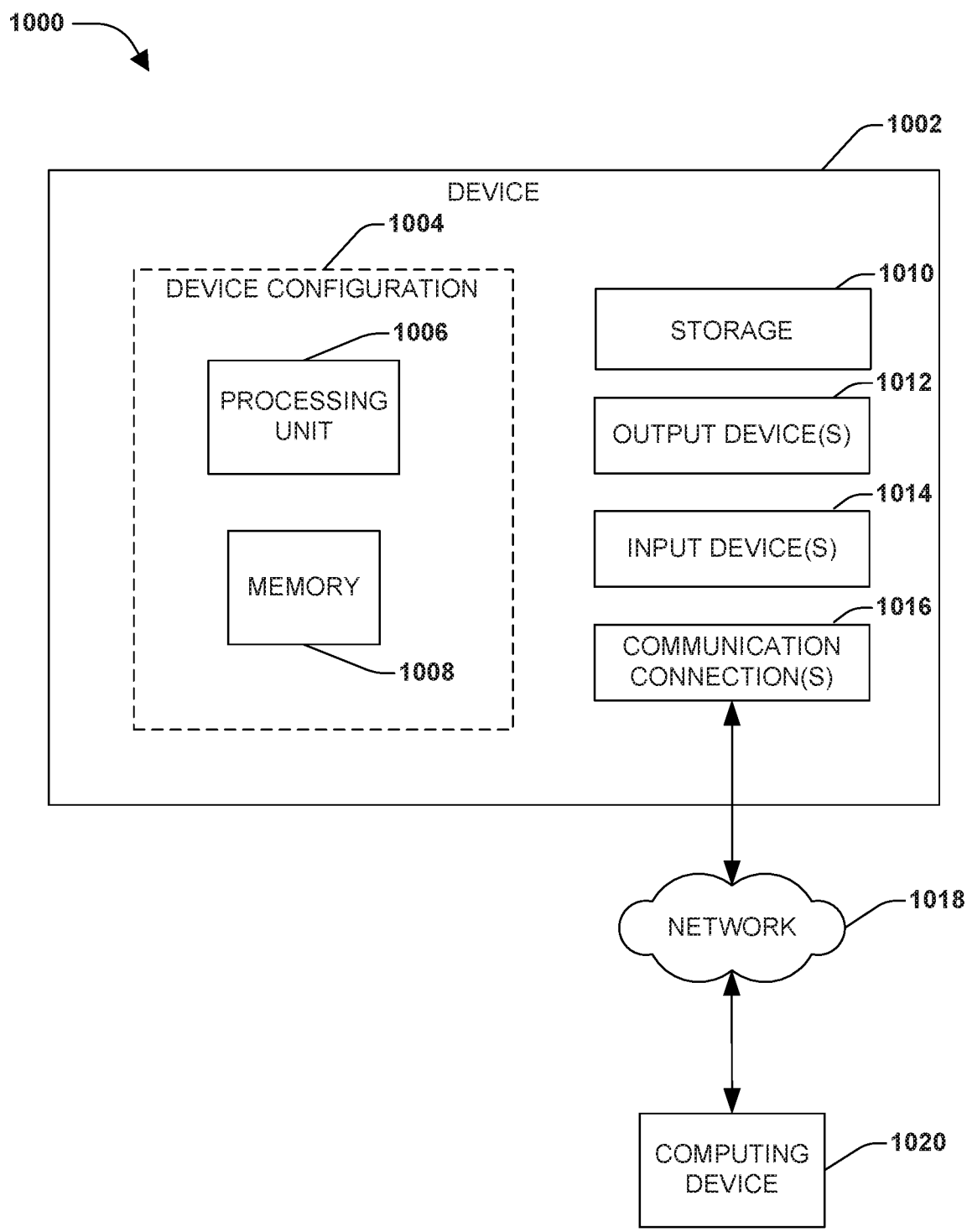
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer storage media. Computer storage media includes volatile and nonvolatile, removable and non-removable media implemented in any method or technology for storage of information such as computer readable instructions or other data. Memory 1008 and storage 1010 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1002. Any such computer storage media may be part of device 1002.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of storing a data set on a server having a processor, the method comprising:
   executing, by the processor, instructions that cause the server to:
      store an item provided in a native item format by:
         converting the item into a base representation of the item having a base representation format, wherein the base representation is logically equivalent to the native item format and is independent of a schema of the native item format; and
         storing the base representation of the item in the data set with other base representations of other items data having the base representation format;
      fulfill a request to provide the item in a requested format by:
         converting the base representation of the item into the requested format; and
         providing the item in the requested format to fulfill the request; and
      fulfill a query in a native query format by:
         generating a translation of the query from the native query format into a base query format that is applicable to the base representation format of the data set including the base representation of the item, the base query format comprising a sequence of query intermediate language instructions that logically execute the query over the data set; and
         applying the translation of the query having the base query format to the data set having the base representation format.

2. The method of claim 1, wherein:
   the base representation of the item further comprises: an atom-record-sequence representation of the item; and
   storing the base representation of the item in the data set further comprises: appending the atom-record-sequence representation of the item to a tree organization of base representations of the items of the data set.

3. The method of claim 2, wherein the tree organization further comprises:
   a set of nodes that are arranged according to a schema of the data set; and
   a set of leaves respectively appended to the nodes and comprising instance values of the items of the data set.

4. The method of claim 2, wherein:
   the item further comprises an array of at least two values; and
   converting the item into the base representation further comprises:
      generating an array container node; and
      for the respective values of the array, appending, to the array container node, a child node for the value.

5. The method of claim 4, appending the child node of a value to the array container node further comprises:
   appending, to the array container node, a child node comprising an array index of the value; and
   appending, to the child node, a grandchild node comprising the value.

6. The method of claim 2, wherein:
   the item further comprises a key/value pair; and
   converting the item into the base representation further comprises:
      appending, to a selected node of the tree organization, a child node comprising a key of the key/value pair; and
      appending, to the child node, a grandchild node comprising a value of the key/value pair.

7. The method of claim 2, wherein:
   the query further comprises a path wildcard, a first query predicate, and a second query predicate; and
   applying the translation of the query to the data set further comprises:
      matching the first query predicate with a first node of the tree organization; and
      matching the second query predicate with a child node of the first node, wherein the first node and the child node are separated by a quantity of zero, one or more intermediate nodes according to the path wildcard.

8. A system for storing a data set on a server, the system comprising:
   a processor; and
   a memory having instructions comprising a data converter, a data provider, and a query processor stored on the memory device executable by the processor to:
      store, by the data converter, an item in the data set by:
         converting the item into a base representation of the item having a base representation format wherein the base representation is logically equivalent to the native item format and is independent of a schema of the native item format; and
         storing the base representation of the item in the data set with other base representations of other items having the base representation format;
      fulfill, by the data provider, a request for the item in a requested format by:
         converting the base representation of the item into the requested format; and providing the item in the requested format to fulfill the request; and
      fulfill, by the query processor, a query in a native query format by:
         generating a translation of the query from the native query format into a base query format that is applicable to the base representation format of the data set including the base representation of the item, the base query format comprising a sequence of query intermediate language instructions that logically execute the query over the data set, and
         applying the translation of the query having the base query format to the data set having the base representation format.

9. The system of claim 8, wherein:
   the base representations of the items of the data set are organized according to a JavaScript Object Notation (JSON) data model; and
   the query intermediate language instructions are specified according to a query intermediate language featuring variable types that are consistent with JavaScript variable types.

10. The system of claim 8, wherein:
    the instructions further comprise a virtual machine that upon execution by the processor executes logical operations over the data set;
    the query intermediate language instructions are further compiled into opcodes according to the logical operations of the virtual machine; and
    applying the translation of the query to the data set further comprises: executing the opcodes through the virtual machine.

11. The system of claim 10, the instructions further comprising: a rule-based optimizer executable by the processor to optimize the opcodes of the query intermediate language instructions for execution by the virtual machine.

12. The system of claim 8, wherein:
the query further comprises a function; and
the query processor upon execution by the processor further generates the translation of the query by:
  translating the function into a sub-sequence of query intermediate language instructions; and
  inserting the sub-sequence of query intermediate language instructions into the sequence of query intermediate language instructions of the query.

13. The system of claim 8, wherein:
the instructions further comprise: an application programming interface set of application programming interfaces that respectively translate queries of a selected query language into the base query format; and
the query processor upon execution by the processor further generates the translation of the query by:
  identifying a selected query language of the query; and
  invoking the application programming interface of the selected query language to translate the query into the base query format.

14. The system of claim 13, the instructions further comprising: an application programming interface extender that upon execution by the processor:
receives a new application programming interface for a new query language to be provided by the database; and
adds the new application programming interface to the application programming interface set.

15. The system of claim 13, wherein:
the query further comprises:
  a first query portion that is specified in a first query language, and
  a second query portion that is specified in a second query language; and
  the query processor upon execution by the processor further invokes the application programming interface by:
    invoking a first application programming interface of the first query language to translate the first query portion into a first base query format portion;
    invoking a second application programming interface of the second query language to translate the second query portion into a second base query format portion; and
    aggregating the first base query format portion and the second base query format portion to produce the translation of the query.

16. A server that stores a data set, the server comprising:
a processor; and
a memory storing instructions that, when executed by the processor, cause the server to:
  store an item provided in a native item format by:
    converting the item into a base representation of the item having a base representation format, wherein the base representation is logically equivalent to the native item format and is independent of a schema of the native item format; and
    storing the base representation of the item in the data set with other base representations of other items having the base representation format;
  fulfill a request to provide the item in a requested format by:
    converting the base representation of the item into the requested format; and
    providing the item in the requested format to fulfill the request; and
  fulfill a query in a native query format by:
    generating a translation of the query from the native query format into a base query format that is applicable to the base representation format of the data set including the base representation of the item, the base query format comprising a sequence of query intermediate language instructions that logically execute the query over the data set; and
    applying the translation of the query having the base query format to the data set having the base representation format.

17. The server of claim 16, wherein the requested format of the request to provide the item is different than both the base representation and the native item format of the item.

18. The server of claim 16, wherein:
the query further requests a query result in a selected communication protocol; and
the server further generates the translation of the query by:
  receiving a query result of the query in the base representation;
  generating a communication protocol translation of the query result from the base representation into the selected communication protocol; and
  providing the communication protocol translation of the query result in response to the query.

19. The server of claim 18, wherein:
the server further comprises a communication protocol set of communication protocols; and
the server further:
  receives a new communication protocol translator for a new communication protocol into which the query result is to be translated; and
  adds the new communication protocol translator to the communication protocol translator set.

* * * * *